(12) United States Patent
Nishigaki et al.

(10) Patent No.: US 7,503,207 B2
(45) Date of Patent: Mar. 17, 2009

(54) ENGINE MISFIRE IDENTIFICATION DEVICE FOR INTERNAL COMBUSTION ENGINE AND ENGINE MISFIRE IDENTIFICATION METHOD

(75) Inventors: Takahiro Nishigaki, Nagoya (JP); Hikokazu Akimoto, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 122 days.

(21) Appl. No.: 11/792,249

(22) PCT Filed: Jan. 11, 2006

(86) PCT No.: PCT/JP2006/000568

§ 371 (c)(1),
(2), (4) Date: Jun. 4, 2007

(87) PCT Pub. No.: WO2006/075766

PCT Pub. Date: Jul. 20, 2006

(65) Prior Publication Data

US 2007/0261484 A1 Nov. 15, 2007

(30) Foreign Application Priority Data

Jan. 11, 2005 (JP) .............................. 2005-004035
Feb. 24, 2005 (JP) .............................. 2005-048445

(51) Int. Cl.
*G01M 15/00* (2006.01)
(52) U.S. Cl. ................................. 73/114.02
(58) Field of Classification Search .............. 73/114.02, 73/114.03, 114.04, 114.05, 114.08
See application file for complete search history.

(56) References Cited

U.S. PATENT DOCUMENTS

| 5,287,736 | A | 2/1994 | Nakayama et al. |
| 5,804,711 | A | 9/1998 | Remboski et al. |
| 5,832,404 | A | 11/1998 | Amano |
| 2008/0148835 | A1* | 6/2008 | Akimoto et al. .......... 73/116.01 |
| 2008/0196485 | A1* | 8/2008 | Akimoto et al. .......... 73/114.02 |

FOREIGN PATENT DOCUMENTS

| EP | 0 880 018 A2 | 11/1998 |
| EP | 1 367 378 A2 | 12/2003 |
| JP | 58-019532 | 2/1983 |

(Continued)

*Primary Examiner*—Eric S McCall
(74) *Attorney, Agent, or Firm*—Kenyon & Kenyon LLP

(57) ABSTRACT

A rotational fluctuation is given as a variation in rotation speed of a crankshaft at every specific crank angle, that is, at every 120 degrees, corresponding to an ignition timing in each cylinder of a six-cylinder engine. The engine misfire identification technique of the invention calculates a difference between a specific rotational fluctuation at a specific crank angle and a previous rotational fluctuation at a crank angle of 360 degrees before the specific crank angle as a rotational fluctuation difference, and sums up the specific rotational fluctuation at the specific crank angle and the previous rotational fluctuation at the crank angle of 360 degrees before the specific crank angle to give a total rotational fluctuation. The engine misfire identification technique successively adopts a single misfire judgment logic, a consecutive misfire judgment logic, and an intermittent misfire judgment logic to discriminate among a single misfire pattern, a consecutive misfire pattern, and an intermittent misfire pattern and distinctly and accurately identify misfires in the engine, based on the calculated rotational fluctuation, rotational fluctuation difference, and total rotational fluctuation.

26 Claims, 14 Drawing Sheets

FOREIGN PATENT DOCUMENTS

| | | |
|---|---|---|
| JP | 08-270490 | 10/1996 |
| JP | 10-318033 | 12/1998 |
| JP | 2001-065402 A | 3/2001 |
| JP | 2003-343340 | 12/2003 |

* cited by examiner

ENGINE MISFIRE IDENTIFICATION DEVICE FOR INTERNAL COMBUSTION ENGINE AND ENGINE MISFIRE IDENTIFICATION METHOD

This is a 371 national phase application of PCT/JP2006/300568 filed 11 Jan. 2006, which claims priority to Japanese Patent Applications No. 2005-004035 filed 11 Jan. 2005, and No. 2005-048445 filed 24 Feb. 2005, respectively, the contents of which are incorporated herein by reference.

TECHNICAL FIELD

The present invention relates to an engine misfire identification device for an internal combustion engine and a corresponding engine misfire identification method. More specifically the invention pertains to an engine misfire identification device to identify misfires in an internal combustion engine having multiple cylinders, as well as to a corresponding engine misfire identification method.

BACKGROUND ART

One proposed engine misfire identification device identifies misfires in an engine, based on a torque compensation value of a motor attached to a crankshaft of the engine (see, for example, Japanese Patent Laid-Open Gazette No. 2001-65402). This engine misfire identification device performs damping control to cancel out a torque change on the crankshaft of the engine with an output torque of the motor and identifies misfires in the engine according to the torque compensation value of the motor for the damping control.

DISCLOSURE OF THE INVENTION

The prior art engine misfire identification device, however, has low accuracy in identification of misfires in the engine. There are several different misfire patterns including a single misfire pattern where only one specific cylinder among the multiple cylinders has a misfire, a consecutive misfire pattern where two consecutive cylinders among the multiple cylinders have misfires, and an intermittent misfire pattern where two non-consecutive cylinders across one combustion cylinder among the multiple cylinders have misfires. Identification of misfires in the engine according to the torque compensation value of the motor for the damping control does not take into account the different misfire patterns and accordingly has low accuracy. Accurate identification of misfires in the engine enables an adequate countermeasure to be taken immediately against the identified misfires and ensures smooth operations of a motor vehicle or another machine equipped with the engine.

The engine misfire identification device and the corresponding engine misfire identification method of the invention thus aim to identify misfires in an internal combustion engine with high accuracy. The engine misfire identification device and the corresponding engine misfire identification method of the invention also aim to distinctly and adequately identify the occurrence and the pattern of misfires in an internal combustion engine.

In order to attain at least part of the above and the other related objects, the engine misfire identification device and the corresponding engine misfire identification method of the invention have the configurations discussed below.

The present invention is directed to an engine misfire identification device that identifies a misfire in an internal combustion engine having multiple cylinders, and the engine misfire identification device includes: a rotational position detection sensor that detects a rotational position of a crankshaft of the internal combustion engine; a rotational fluctuation computation unit that sequentially computes a rotational fluctuation of the internal combustion engine at every specific crank angle corresponding to an ignition timing in each of the multiple cylinders of the internal combustion engine, from the detected rotational position of the crankshaft; and an engine misfire identification module that adopts multiple different misfire judgment logics corresponding to multiple different misfire patterns to identify a misfire in the internal combustion engine, based on the sequentially computed rotational fluctuations.

The engine misfire identification device of the invention sequentially computes the rotational fluctuation of the internal combustion engine at every specific crank angle corresponding to the ignition timing in each of the multiple cylinders of the internal combustion engine, from the rotational position of the crankshaft of the internal combustion engine, and adopts the multiple different misfire judgment logics corresponding to the multiple different misfire patterns to identify a misfire in the internal combustion engine, based on the sequentially computed rotational fluctuations. This arrangement distinctly and adequately identifies the occurrence and the pattern of the misfire in the internal combustion engine with high accuracy. The internal combustion engine may be mounted on a hybrid vehicle that is driven at a specific drive point of the internal combustion engine set independently of a driving state of the hybrid vehicle.

In the engine misfire identification device of the invention, the multiple different misfire judgment logics adopted by the engine misfire identification module for identification of a misfire in the internal combustion engine may include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment-logic to identify an intermittent misfire pattern where two non-consecutive cylinders across one combustion cylinder have misfires. The 'two consecutive cylinders' in the consecutive misfire pattern represent two cylinders to be ignited consecutively in this order. The 'two non-consecutive cylinders across one combustion cylinder' in the intermittent misfire pattern represent two cylinders to be ignited immediately before and immediately after ignition in one combustion cylinder.

The engine misfire identification device of the invention adopts multiple different misfire judgment logics for identification of a misfire in the internal combustion, which include at least one of the single misfire judgment logic and the intermittent misfire judgment logic. In one embodiment, the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range. In this embodiment, the another rotational fluctuation includes at least one of a third last rotational fluctuation computed before the object rotational fluctuation, a last rotational fluctuation computed immediately before the object rotational fluctuation, and a next rotational fluctuation computed immediately after the object rotational fluctuation.

This arrangement distinctly and adequately identifies the occurrence of the misfire in the internal combustion engine with high accuracy. The engine misfire identification device of the invention may include: a rotation speed measurement unit that measures a rotation speed of the internal combustion engine; and a first single misfire judgment value regulation module that regulates the single misfire judgment value to decrease with an increase in measured rotation speed of the internal combustion engine. Further, the engine misfire identification device of the invention may include an air intake amount measurement unit that measures an amount of intake air into the internal combustion engine; and a second single misfire judgment value regulation module that calculates a cycle air intake amount in one cycle of the internal combustion engine from the measured amount of intake air and regulates the single misfire judgment value to increase with an increase in calculated cycle air intake amount. This arrangement distinctly and adequately identifies the occurrence of the misfire in the internal combustion engine with high accuracy.

The engine misfire identification device of the invention adopts multiple different misfire judgment logics for identification of a misfire in the internal combustion, which include at least one of the single misfire judgment logic, the consecutive misfire judgment logic and the intermittent misfire judgment logic. In one embodiment, the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value. In this embodiment, the consecutive misfire judgment logic identifies consecutive misfires in the internal combustion engine when a ratio of another rotational fluctuation difference to the object rotational fluctuation difference of not less than the preset consecutive misfire judgment value is in a preset consecutive misfire judgment range. Further, the another rotational fluctuation difference includes at least one of a third last rotational fluctuation difference calculated before the object rotational fluctuation difference, a last rotational fluctuation difference calculated immediately before the object rotational fluctuation difference, and a next rotational fluctuation difference calculated immediately after the object rotational fluctuation difference. This arrangement distinctly and adequately identifies the occurrence of the misfire in the internal combustion engine with high accuracy. The engine misfire identification device of the invention may include: a rotation speed measurement unit that measures a rotation speed of the internal combustion engine; and a first consecutive misfire judgment value regulation module that regulates the consecutive misfire judgment value to decrease with an increase in measured rotation speed of the internal combustion engine. Moreover, the engine misfire identification device of the invention may include: an air intake amount measurement unit that measures an amount of intake air into the internal combustion engine; and a second consecutive misfire judgment value regulation module that calculates a cycle air intake amount in one cycle of the internal combustion engine from the measured amount of intake air and regulates the consecutive misfire judgment value to increase with an increase in calculated cycle air intake amount. This arrangement distinctly and adequately identifies the occurrence of the misfire in the internal combustion engine with high accuracy.

The engine misfire identification device of the invention adopts multiple different misfire judgment logics for identification of a misfire in the internal combustion, which include at least one of the single misfire judgment logic, the consecutive misfire judgment logic and the intermittent misfire judgment logic. In one embodiment, the intermittent misfire judgment logic successively calculates a total rotational fluctuation as a sum of each of the rotational fluctuations sequentially computed at every specific crank angle and a previous rotational fluctuation computed at a crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value. In this embodiment, the intermittent misfire judgment logic identifies intermittent misfires in the internal combustion engine when a ratio of another total rotational fluctuation to the object total rotational fluctuation of not less than the preset intermittent misfire judgment value is in a preset intermittent misfire judgment range. The another total rotational fluctuation may be a last total rotational fluctuation calculated immediately before the object total rotational fluctuation. This arrangement distinctly and adequately identifies the occurrence of the misfire in the internal combustion engine with high accuracy. The engine misfire identification device of the invention may include: a rotation speed measurement unit that measures a rotation speed of the internal combustion engine; and a first intermittent misfire judgment value regulation module that regulates the intermittent misfire judgment value to decrease with an increase in measured rotation speed of the internal combustion engine. Further, the engine misfire identification device of the invention may include: an air intake amount measurement unit that measures an amount of intake air into the internal combustion engine; and a second intermittent misfire judgment value regulation module that calculates a cycle air intake amount in one cycle of the internal combustion engine from the measured amount of intake air and regulates the intermittent misfire judgment value to increase with an increase in calculated cycle air intake amount.

The engine misfire identification device of the invention adopts multiple different misfire judgment logics for identification of a misfire in the internal combustion, which include at least one of the single misfire judgment logic, the consecutive misfire judgment logic and the intermittent misfire judgment logic. In one embodiment, the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range; the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value; and the intermittent misfire judgment logic successively calculates a total rotational fluctuation as a sum of each of the rotational fluctuations sequentially computed at every specific crank angle and a previous rotational fluctuation computed at a crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value. In this embodiment, the rotational fluctuation computation unit calculates an angular velocity at every preset crank angle of the crankshaft of the internal combustion engine and computes a difference between a specific angular velocity corresponding to an ignition timing in each of the multiple cylinders of the internal combustion engine and a last angular velocity calculated immediately before the specific angular velocity, as the rotational fluctuation. The rotational fluctuation computation unit computes an angular acceleration corresponding to an ignition timing in each of the multiple cylinders of the internal combustion engine, as the rotational fluctuation.

In one embodiment of the engine misfire identification device of the invention, the internal combustion engine has an even number of the multiple cylinders, and the multiple different misfire judgment logics adopted by the engine misfire identification module for identification of a misfire in the internal combustion engine include at least one of the single misfire judgment logic, the consecutive misfire judgment logic, the intermittent misfire judgment logic, an opposed misfire judgment logic to identify an opposed misfire pattern where two opposed cylinders among the multiple cylinders have misfires, and a random misfire judgment logic to identify a random misfire pattern where one of the multiple cylinders has a misfire irregularly in one cycle of the internal combustion engine. The 'two opposed cylinders' in the opposed misfire pattern represent two cylinders having a mirror image-like arrangement in an ignition order, for example, a first cylinder and a fourth cylinder in an ignition order among six cylinders or a first cylinder and a fifth cylinder in an ignition order among eight cylinders. The terminology 'having a misfire irregularly in one cycle of the internal combustion engine' in the random misfire pattern means that there is only one misfire cylinder in one cycle of the internal combustion engine but the misfire cylinder is not fixed but is changed. For example, a first cylinder in an ignition order has a misfire in one cycle but another cylinder in the ignition order has a misfire in another cycle.

The engine misfire identification device of the invention adopts multiple different misfire judgment logics for identification of a misfire in the internal combustion, which include at least one of the opposed misfire judgment logic and the random misfire judgment logic. In one embodiment, the opposed misfire judgment logic successively calculates a rotational fluctuation difference as a difference between each of the rotational fluctuations sequentially computed at every specific crank angle and a previous rotational fluctuation computed at a crank angle of 120 degrees before the specific crank angle, and identifies opposed misfires in the internal combustion engine when two rotational fluctuation differences defined as two object rotational fluctuation differences among the rotational fluctuation differences successively calculated in one cycle of the internal combustion engine are not less than a preset opposed misfire judgment value. In this embodiment, the opposed misfire judgment logic identifies opposed misfires in the internal combustion engine when a ratio of the two object rotational fluctuation differences of not less than the preset opposed misfire judgment value is in a preset first opposed misfire judgment range and when a ratio of another rotational fluctuation difference to a sum of the two object rotational fluctuation differences is in a preset second opposed misfire judgment range. Further, the another rotational fluctuation difference includes at least either of two last rotational fluctuation differences calculated immediately before the two object rotational fluctuation differences and two second last rotational fluctuation differences calculated before the two object rotational fluctuation differences. This arrangement distinctly and adequately identifies the occurrence of the misfire in the internal combustion engine with high accuracy. The engine misfire identification device of the invention may include a rotation speed measurement unit that measures a rotation speed of the internal combustion engine; and a first opposed misfire judgment value regulation module that regulates the opposed misfire judgment value to decrease with an increase in measured rotation speed of the internal combustion engine. Further, the engine misfire identification device of the invention may include: an air intake amount measurement unit that measures an amount of intake air into the internal combustion engine; and a second opposed misfire judgment value regulation module that calculates a cycle air intake amount in one cycle of the internal combustion engine from the measured amount of intake air and regulates the opposed misfire judgment value to increase with an increase in calculated cycle air intake amount.

The engine misfire identification device of the invention adopts multiple different misfire judgment logics for identification of a misfire in the internal combustion, which include at least one of the opposed misfire judgment logic and the random misfire judgment logic. In one embodiment, the random misfire judgment logic successively calculates a rotational fluctuation difference as a difference between each of the rotational fluctuations sequentially computed at every specific crank angle and a previous rotational fluctuation computed at a crank angle of 90 degrees before the specific crank angle, and identifies a random misfire in the internal combustion engine when one rotational fluctuation difference defined as an object rotational fluctuation difference among the rotational fluctuation differences successively calculated in one cycle of the internal combustion engine is not less than a preset random misfire judgment value. In this embodiment, the random misfire judgment logic identifies a random misfire in the internal combustion engine when a ratio of another rotational fluctuation difference to the object rotational fluctuation difference of not less than the preset random misfire judgment value is in a preset random misfire judgment range. The another rotational fluctuation difference may include at least one of a last rotational fluctuation difference calculated immediately before the object rotational fluctuation difference, a next rotational fluctuation difference calculated immediately after the object rotational fluctuation difference, and a third next rotational fluctuation difference calculated after the object rotational fluctuation difference. This arrangement distinctly and adequately identifies the occurrence of the misfire in the internal combustion engine with high accuracy. The engine misfire identification device may include: a rotation speed measurement unit that measures a rotation speed of the internal combustion engine; and a first random misfire judgment value regulation module that regulates the random misfire judgment value to decrease with an increase in measured rotation speed of the internal combustion engine. Further, the engine misfire identification device of the invention may include: an air intake amount measurement unit that measures an amount of intake air into the internal combustion engine; and a second random misfire judgment value regulation module that calculates a cycle air intake amount in one cycle of the internal combustion engine from the measured amount of intake air and regulates the random misfire judgment value to increase with an increase in calculated cycle air intake amount.

The engine misfire identification device of the invention adopts multiple different misfire judgment logics for identification of a misfire in the internal combustion, which include at least one of the opposed misfire judgment logic and the random misfire judgment logic. In one embodiment, the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range; the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value; the intermittent misfire judgment logic successively calculates a total rotational fluctuation as a sum of each of the rotational fluctuations sequentially computed at every specific crank angle and a previous rotational fluctuation computed at a crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value; the opposed misfire judgment logic successively calculates a rotational fluctuation difference as a difference between each of the rotational fluctuations sequentially computed at every specific crank angle and a previous rotational fluctuation computed at a crank angle of 120 degrees before the specific crank angle, and identifies opposed misfires in the internal combustion engine when two rotational fluctuation differences defined as two object rotational fluctuation differences among the rotational fluctuation differences successively calculated in one cycle of the internal combustion engine are not less than a preset opposed misfire judgment value; and the random misfire judgment logic successively calculates a rotational fluctuation difference as a difference between each of the rotational fluctuations sequentially computed at every specific crank angle and a previous rotational fluctuation computed at a crank angle of 90 degrees before the specific crank angle, and identifies a random misfire in the internal combustion engine when one rotational fluctuation difference defined as an object rotational fluctuation difference among the rotational fluctuation differences successively calculated in one cycle of the internal combustion engine is not less than a preset random misfire judgment value. In this embodiment, the rotational fluctuation computation unit calculates an angular velocity at every preset crank angle of the crankshaft of the internal combustion engine and computes a difference between a specific angular velocity corresponding to an ignition timing in each of the multiple cylinders of the internal combustion engine and a last angular velocity calculated immediately before the specific angular velocity, as the rotational fluctuation. The rotational fluctuation computation unit may compute an angular acceleration corresponding to an ignition timing in each of the multiple cylinders of the internal combustion engine, as the rotational fluctuation.

In the engine misfire identification device of the invention, the rotational fluctuation computation unit may calculate an angular velocity at every preset crank angle of the crankshaft of the internal combustion engine and computes a difference between a specific angular velocity corresponding to an ignition timing in each of the multiple cylinders of the internal combustion engine and a last angular velocity calculated immediately before the specific angular velocity, as the rotational fluctuation. Further, the rotational fluctuation computation unit may compute an angular acceleration corresponding to an ignition timing in each of the multiple cylinders of the internal combustion engine, as the rotational fluctuation.

The present invention is directed to a first engine misfire identification method that identifies a misfire in an internal combustion engine having multiple cylinders, and the first engine misfire identification method includes the steps of: sequentially computing a rotational fluctuation of the internal combustion engine at every specific crank angle corresponding to an ignition timing in each of the multiple cylinders of the internal combustion engine, from a rotational position of a crankshaft of the internal combustion engine; and adopting multiple different misfire judgment logics corresponding to multiple different misfire patterns to identify a misfire in the internal combustion engine, based on the sequentially computed rotational fluctuations, where the multiple different misfire judgment logics include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment logic to identify an intermittent misfire pattern where two non-consecutive cylinders across one combustion cylinder have misfires.

The first engine misfire identification method of the invention sequentially computes the rotational fluctuation of the internal combustion engine at every specific crank angle corresponding to the ignition timing in each of the multiple cylinders of the internal combustion engine, from the rotational position of the crankshaft of the internal combustion engine, and adopts the multiple different misfire judgment logics corresponding to the multiple different misfire patterns to identify a misfire in the internal combustion engine, based on the sequentially computed rotational fluctuations. The multiple different misfire judgment logics adopted for identification of a misfire in the internal combustion engine include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment logic to identify an intermittent misfire pattern where two non-consecutive cylinders across one combustion cylinder have misfires. This arrangement distinctly and adequately identifies the occurrence and the pattern of the misfire in the internal combustion engine with high accuracy.

In the first engine misfire identification method of the invention, the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range; the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value; and the intermittent misfire judgment logic successively calculates a total rotational fluctuation as a sum of each of the rotational fluctuations sequentially computed at every specific crank angle and a previous rotational fluctuation computed at a crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value.

The present invention is directed to a second engine misfire identification method that identifies a misfire in an internal combustion engine having an even number of multiple cylinders, and the second engine misfire identification method includes the steps of: sequentially computing a rotational fluctuation of the internal combustion engine at every specific crank angle corresponding to an ignition timing in each of the multiple cylinders of the internal combustion engine, from a rotational position of a crankshaft of the internal combustion engine; and adopting multiple different misfire judgment logics corresponding to multiple different misfire patterns to identify a misfire in the internal combustion engine, based on the sequentially computed rotational fluctuations, where the multiple different misfire judgment logics include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, an intermittent misfire judgment logic to identify an intermittent misfire pattern where two non-consecutive cylinders across one combustion cylinder have misfires, an opposed misfire judgment logic to identify an opposed misfire pattern where two opposed cylinders among the multiple cylinders have misfires, and a random misfire judgment logic to identify a random misfire pattern where one of the multiple cylinders has a misfire irregularly in one cycle of the internal combustion engine.

The second engine misfire identification method of the invention sequentially computes the rotational fluctuation of the internal combustion engine at every specific crank angle corresponding to the ignition timing in each of the multiple cylinders of the internal combustion engine, from the rotational position of the crankshaft of the internal combustion engine, and adopts the multiple different misfire judgment logics corresponding to the multiple different misfire patterns to identify a misfire in the internal combustion engine, based on the sequentially computed rotational fluctuations. The multiple different misfire judgment logics adopted for identification of a misfire in the internal combustion engine include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, an intermittent misfire judgment logic to identify an intermittent misfire pattern where two non-consecutive cylinders across one combustion cylinder have misfires, an opposed misfire judgment logic to identify an opposed misfire pattern where two opposed cylinders among the multiple cylinders have misfires, and a random misfire judgment logic to identify a random misfire pattern where one of the multiple cylinders has a misfire irregularly in one cycle of the internal combustion engine. This arrangement distinctly and adequately identifies the occurrence and the pattern of the misfire in the internal combustion engine with high accuracy.

In the second engine misfire-identification method of the invention, the single misfire judgment logic may identify a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range; the consecutive misfire judgment logic successively may calculate a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value; and the intermittent misfire judgment logic successively may calculate a total rotational fluctuation as a sum of each of the rotational fluctuations sequentially computed at every specific crank angle and a previous rotational fluctuation computed at a crank angle of 360 degrees before the specific crank angle, and identify intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value; the opposed misfire judgment logic successively may calculate a rotational fluctuation difference as a difference between each of the rotational fluctuations sequentially computed at every specific crank angle and a previous rotational fluctuation computed at a crank angle of 120 degrees before the specific crank angle, and identifies opposed misfires in the internal combustion engine when two rotational fluctuation differences defined as two object rotational fluctuation differences among the rotational fluctuation differences successively calculated in one cycle of the internal combustion engine are not less than a preset opposed misfire judgment value; and the random misfire judgment logic successively may calculate a rotational fluctuation difference as a difference between each of the rotational fluctuations sequentially computed at every specific crank angle and a previous rotational fluctuation computed at a crank angle of 90 degrees before the specific crank angle, and identifies a random misfire in the internal combustion engine when one rotational fluctuation difference defined as an object rotational fluctuation difference among the rotational fluctuation differences successively calculated in one cycle of the internal combustion engine is not less than a preset random misfire judgment value.

BEST MODES OF CARRYING OUT THE INVENTION

Figure 1:
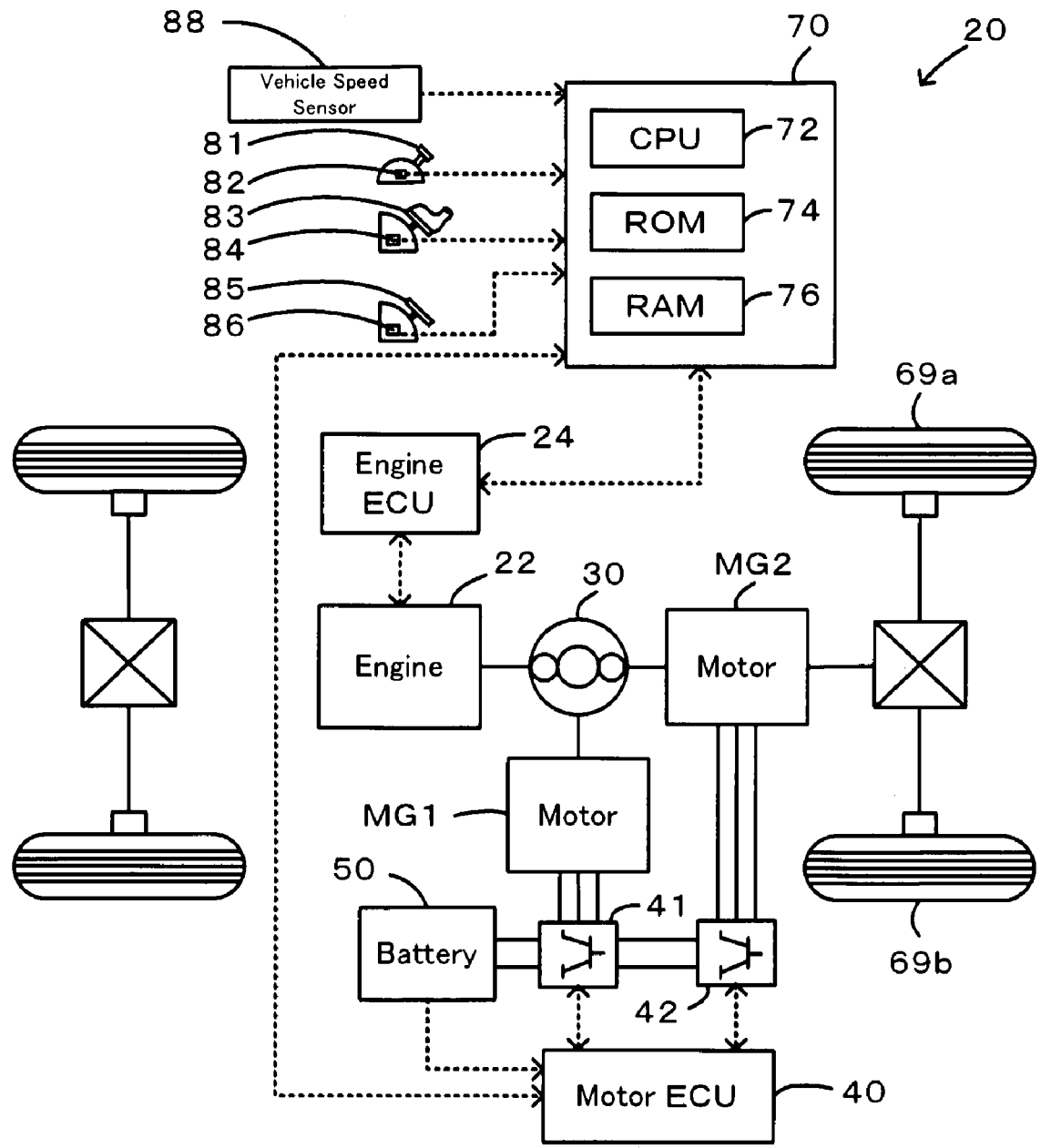
FIG. 1 schematically illustrates the configuration of a hybrid vehicle equipped with an engine misfire identification device in a first embodiment of the invention.
Figure 2:
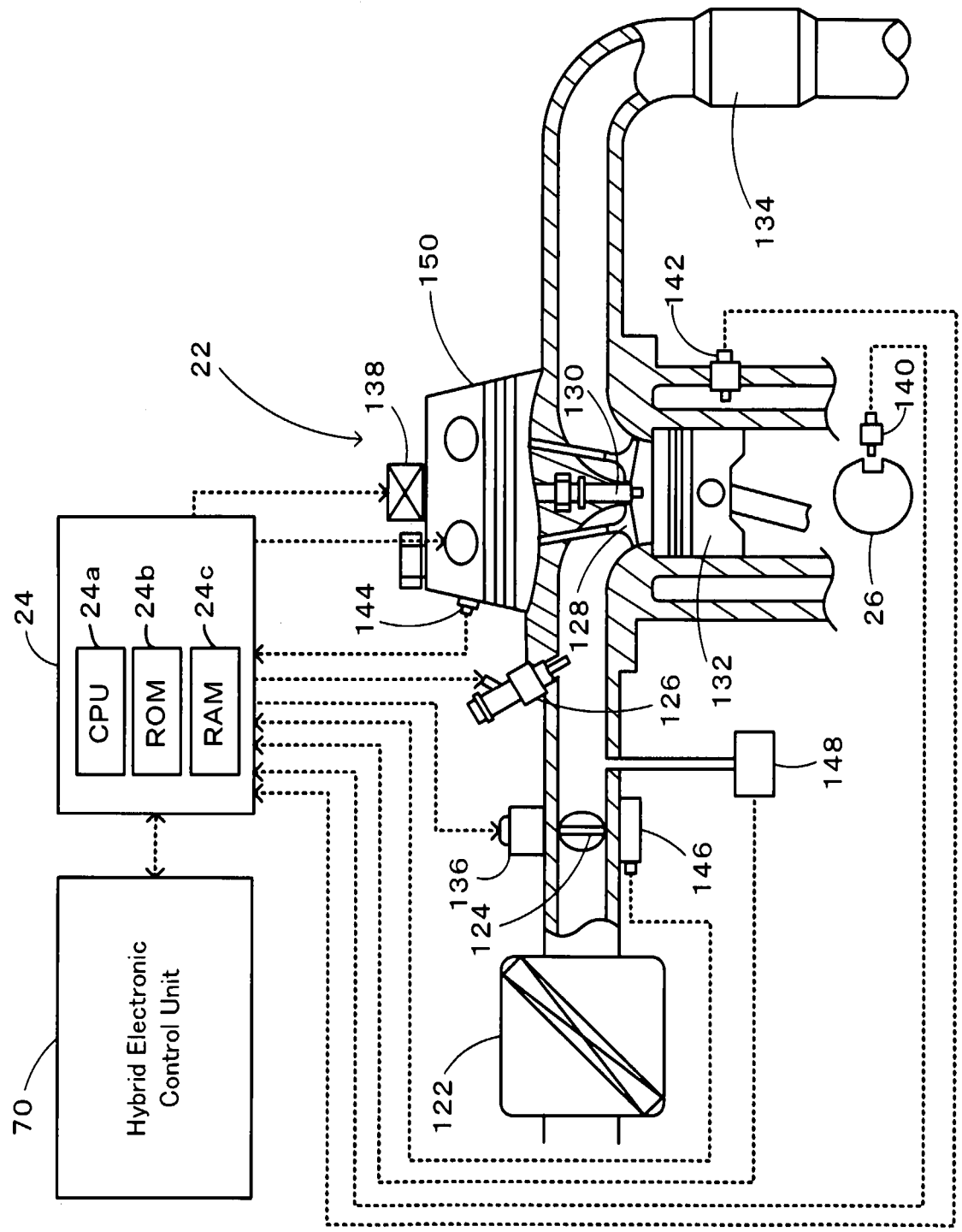
FIG. 2 illustrates the schematic structure of an engine electronic control unit mounted on the hybrid vehicle of FIG. 1 to function as the engine misfire identification device and an engine driven and controlled by the engine electronic control unit.

Some modes of carrying out the invention are described below as preferred embodiments. FIG. 1 schematically illustrates the configuration of a hybrid vehicle 20 equipped with an engine misfire identification device in a first embodiment of the invention. FIG. 2 illustrates the schematic structure of an engine electronic control unit 24 functioning as the engine misfire identification device and an engine 22 driven and controlled by the engine electronic control unit 24. As shown in FIG. 1, the hybrid vehicle 20 of the embodiment includes the engine 22 that is driven and controlled by the engine electronic control unit 24 (shown as engine ECU in FIG. 1), a planetary gear mechanism 30 that includes a carrier linked to a crankshaft 26 or an output shaft of the engine 22 and a ring gear linked to a driveshaft coupled with an axle of drive wheels 69a and 69b, and a motor MG1 that is connected to a sun gear of the planetary gear mechanism 30, is driven and controlled via an inverter 41 by a motor electronic control unit 40 (shown as motor ECU in FIG. 1), and is capable of generating electric power. The hybrid vehicle 20 of the embodiment also includes a motor MG2 that is attached to the driveshaft coupled with the axle of the drive wheels 69a and 69b, is driven and controlled via an inverter 42 by the motor electronic control unit 40, and is capable of inputting and outputting power, a battery 50 that transmits electric power to and from the motors MG1 and MG2 via the inverters 41 and 42, and a hybrid electronic control unit 70 that controls the operations of the whole hybrid vehicle 20. The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 communicates with the engine electronic control unit 24 and with the motor electronic control unit 40 via the communication port to send control signals to and receive data from the engine electronic control unit 24 and the motor electronic control unit 40.

The engine 22 is an inline six-cylinder internal combustion engine that consumes a hydrocarbon fuel, for example, gasoline or light oil, and outputs power. As shown in FIG. 2, the air cleaned by an air cleaner 122 and taken in via a throttle valve 124 is mixed with the atomized gasoline injected by a fuel injection valve 126 to the air-fuel mixture. An intake valve 128 is opened to introduce the air-fuel mixture into a combustion chamber of each of the six cylinders. The introduced air-fuel mixture is ignited with spark of an ignition plug 130 to be explosively combusted. The reciprocating motions of a piston 132 in each cylinder by the combustion energy are converted into rotational motions of the crankshaft 26. The exhaust from the engine 22 goes through a catalytic converter (three-way catalyst) 134 that converts toxic components included in the exhaust, that is, carbon monoxide (CO), hydrocarbons (HC), and nitrogen oxides (NOx), into harmless components, and is discharged to the outside air. In the engine 22 of the embodiment, the pistons 132 of the respective six cylinders are arranged on the crankshaft 26 to have ignition timings shifted at intervals of a crank angle CA of 120 degrees.

The engine electronic control unit 24 for controlling the operations of the engine 22 is constructed as a microprocessor including a CPU 24a, a ROM 24b that stores processing programs, a RAM 24c that temporarily stores data, a flash memory (not shown), input and output ports (not shown), and a communication port (not shown). The engine electronic control unit 24 receives, via its input port, signals from various sensors that measure and detect the conditions of the engine 22. The signals input into the engine electronic control unit 24 include a crank angle CA from a crank angle sensor 140 measured as the rotational angle of the crankshaft 26, a cooling water temperature from a water temperature sensor 142 measured as the temperature of cooling water circulated in the engine 22, a cam position from a cam position sensor 144 measured as the rotational position of a camshaft driven to open and close the intake valve 128 and an exhaust valve for gas intake and exhaust into and from the combustion chamber, a throttle valve position from a throttle valve position sensor 146 detected as the position of the throttle valve 124, and an amount of intake air Ga from a vacuum sensor 148 measured as the load of the engine 22. The crank angle sensor 140 is an MRE rotation sensor having a magnetic resistance element arranged at a position to face a magnet rotor (not shown) attached to the crankshaft 26. The crank angle sensor 140 generates a pulse at every preset angle (for example, at a crank angle CA of every 10 degrees). The procedure of this embodiment specifies the crank angle CA and computes a rotation speed N of the engine 22 from the pulses generated by the crank angle sensor 140. The engine electronic control unit 24 outputs, via its output port, diverse control signals and driving signals to drive and control the engine 22, for example, driving signals to the fuel injection valve 126, driving signals to a throttle motor 136 for regulating the position of the throttle valve 124, controls signals to an ignition coil 138 integrated with an igniter, and control signals to a variable valve timing mechanism 150 to vary the open and close timings of the intake valve 128. As mentioned previously, the engine electronic control unit 24 communicates with the hybrid electronic control unit 70. The engine electronic control unit 24 receives the control signals from the hybrid electronic control unit 70 to drive and control the engine 22, while outputting data regarding the driving conditions of the engine 22 to the hybrid electronic control unit 70 according to the requirements.

Figure 3:
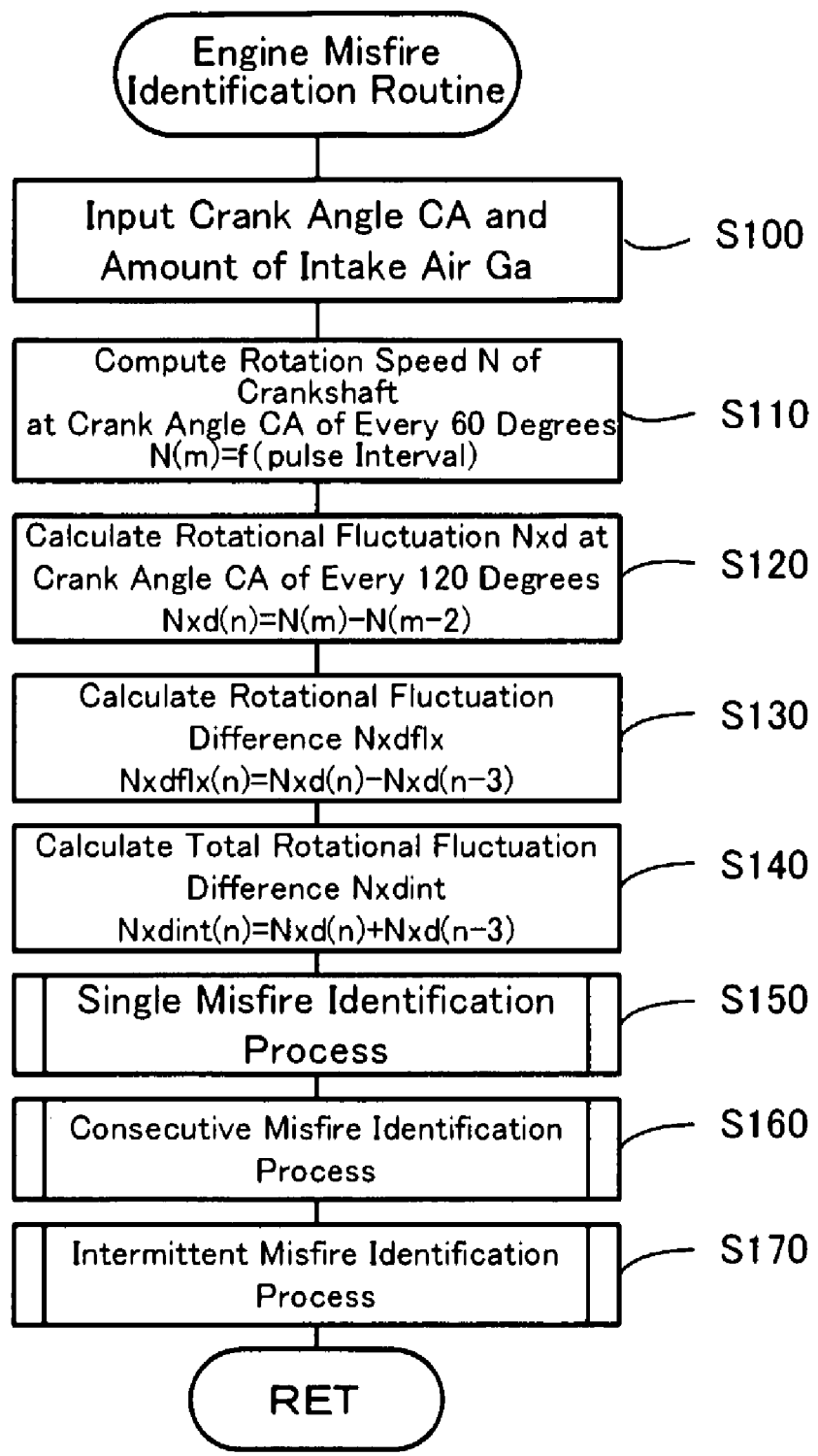
FIG. 3 is a flowchart showing an engine misfire identification routine executed by the engine electronic control unit of FIG. 2.

The description regards the operations of the hybrid vehicle 20 of the embodiment constructed as discussed above, especially a series of control executed by the engine electronic control unit 24 to identify misfires of the engine 22. FIG. 3 is a flowchart showing an engine misfire identification routine executed by the engine electronic control unit 24. The engine misfire identification routine is performed repeatedly after a start of the engine 22.

In the engine misfire identification routine, the engine electronic control unit 24 inputs data required for identification of misfires, that is, the crank angle CA from the crank angle sensor 140 and the amount of intake air Ga from the vacuum sensor 148 (step S100), and computes the rotation speed N of the crankshaft 26 at every specific crank angle CA, that is, at every 60 degrees, from the input crank angle CA (step S110). The rotation speed N of the crankshaft 26 at the crank angle CA of every 60 degrees is computable from the interval of pulses generated at the crank angle CA of every 10 degrees. The engine electronic control unit 24 then calculates a difference between a specific rotation speed N at a specific crank angle CA and a previous rotation speed N at a crank angle CA of 120 degrees before the specific crank angle CA, as a rotational fluctuation Nxd at the crank angle CA of every 120 degrees corresponding to the ignition timing in each cylinder of the engine 22 (step S120). The engine electronic control unit 24 calculates a difference between a specific rotational fluctuation Nxd at a specific crank angle CA and a previous rotational fluctuation Nxd at a crank angle CA of 360 degrees before the specific crank angle CA, as a rotational fluctuation difference Nxdflx (step S130). The engine electronic control unit 24 sums up the specific rotational fluctuation Nxd at the specific crank angle CA and the previous rotational fluctuation Nxd at the crank angle CA of 360 degrees before the specific crank angle CA to give a total rotational fluctuation Nxdint (step S140). The rotational fluctuation Nxd is calculated at the crank angle CA of every 120 degrees. The previous rotational fluctuation Nxd at the crank angle CA of 360 degrees before the specific crank angle CA is accordingly obtained by the third last calculation. In the flowchart of FIG. 3, the specific rotational fluctuation Nxd at the specific crank angle CA and the previous rotational fluctuation Nxd at the crank angle CA of 360 degrees before the specific crank angle CA are expressed respectively as Nxd(n) and Nxd(n−3).

After calculation of the rotational fluctuation Nxd, the rotational fluctuation difference Nxdflx, and the total rotational fluctuation Nxdint, the engine electronic control unit 24 sequentially performs a single misfire identification process (step S150), a consecutive misfire identification process (step S160), and an intermittent misfire identification process (step S170) with these calculated values to detect a single misfire, consecutive misfires, or intermittent misfires if any and exits from the engine misfire identification routine of FIG. 3. The single misfire identification process of step S150 identifies a single misfire pattern where only one of the six cylinders has a misfire, and is performed according to the flowchart of FIG. 4. The consecutive misfire identification process of step S160 identifies a consecutive misfire pattern where two consecutive cylinders among the six cylinders have misfires, and is performed according to the flowchart of FIG. 5. The intermittent misfire identification process of step S170 identifies an intermittent misfire pattern where two non-consecutive cylinders across one combustion cylinder among the six cylinders have misfires, and is performed according to the flowchart of FIG. 6. The details of the single misfire identification process, the consecutive misfire identification process, and the intermittent misfire identification process are sequentially described below with reference to the flowcharts of FIGS. 4 through 6.

Figure 4:
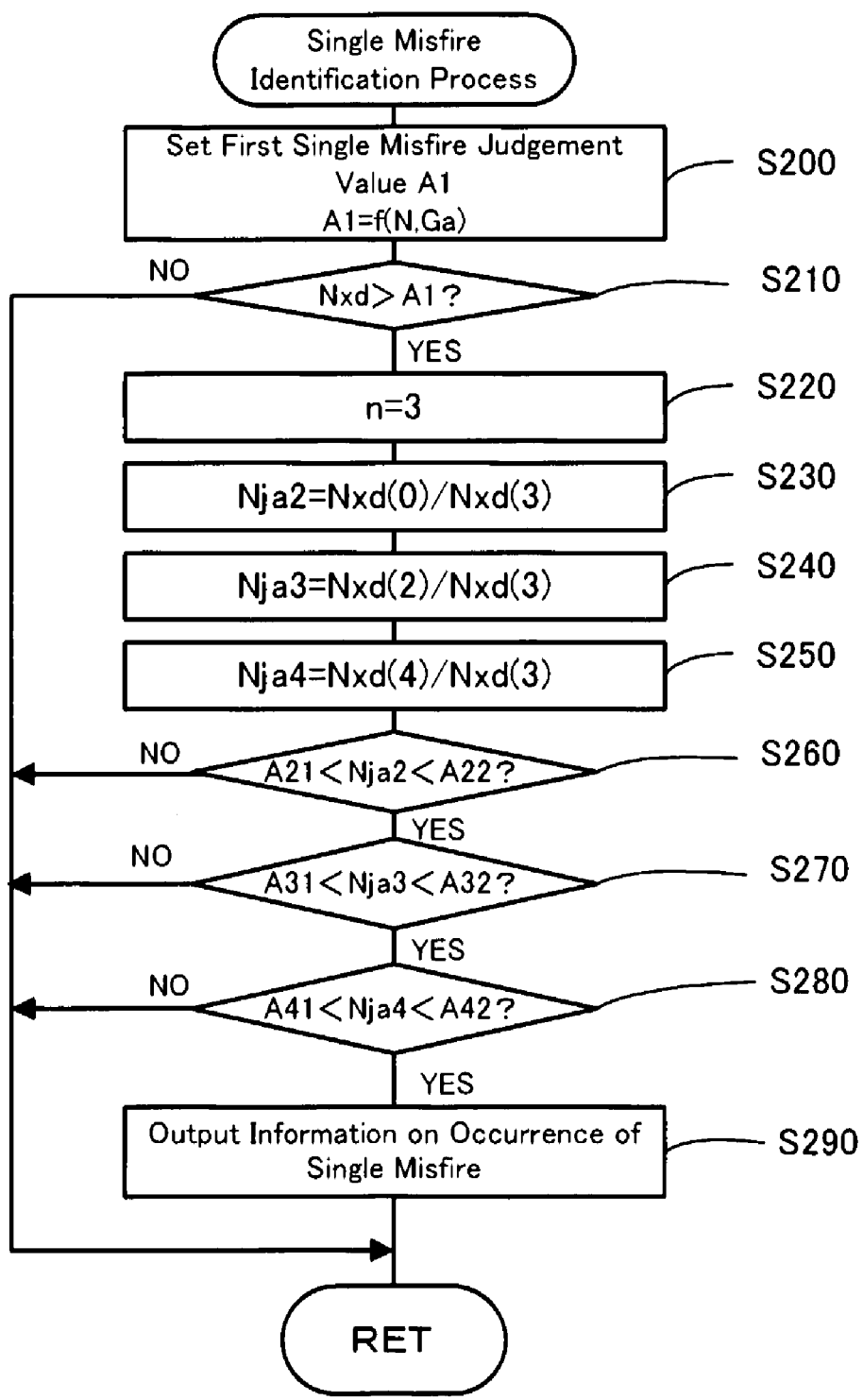
FIG. 4 is a flowchart showing the details of a single misfire identification process in the engine misfire identification routine of FIG. 3.
Figure 7:
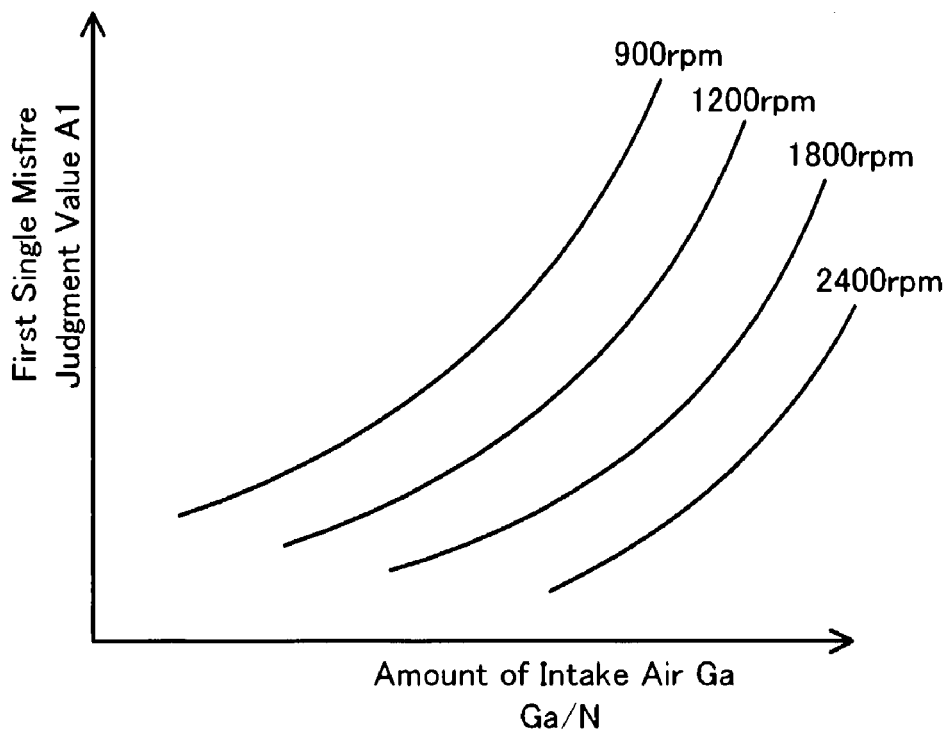
FIG. 7 shows variations in first single misfire judgment value A1 against the amount of intake air Ga in each rotation of a crankshaft with regard to various rotation speeds N of the crankshaft.
Figure 8:
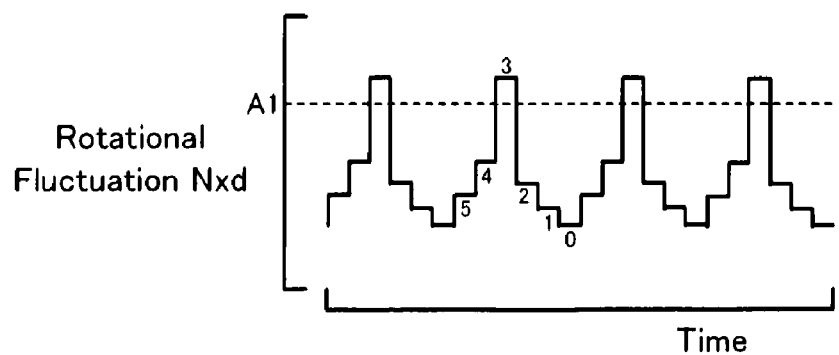
FIG. 8 shows a time change of a rotational fluctuation Nxd in the occurrence of a single misfire.

In the single misfire identification process shown in the flowchart of FIG. 4, the engine electronic control unit 24 sets a first single misfire judgment value A1 as one reference value for identifying a single misfire, based on the rotation speed N of the crankshaft 26 and the amount of intake air Ga (step S200). The first single misfire judgment value A1 is set to decrease with an increase in rotation speed N of the crankshaft 26 and to increase with an increase in amount of intake air Ga in each rotation of the crankshaft 26. FIG. 7 shows variations in first single misfire judgment value A1 against the amount of intake air Ga in each rotation of the crankshaft 26 with regard to various rotation speeds N of the crankshaft 26. The engine electronic control unit 24 then compares the calculated rotational fluctuation Nxd with the first single misfire judgment value A1 (step S210). When the rotational fluctuation Nxd is not greater than the first single misfire judgment value A1 at step S210, the engine electronic control unit 24 determines the non-occurrence of a single misfire and immediately terminates the single misfire identification process of FIG. 4. When the rotational fluctuation Nxd is greater than the first single misfire judgment value A1 at step S210, on the other hand, the engine electronic control unit 24 specifies a third cylinder among the six cylinders as a misfire cylinder with the greater rotational fluctuation Nxd (that is, Nxd(3)) (step S220). The engine electronic control unit 24 then divides a third last rotational fluctuation Nxd(0) of a third last cylinder before the misfire cylinder by the rotational fluctuation Nxd(3) of the misfire cylinder to calculate a rotational fluctuation ratio Nja2 (step S230). Similarly the engine electronic control unit 24 divides a last rotational fluctuation Nxd(2) of a last cylinder immediately before the misfire cylinder by the rotational fluctuation Nxd(3) of the misfire cylinder to calculate a rotational fluctuation ratio Nja3 (step S240), and divides a next rotational fluctuation Nxd(4) of a next cylinder immediately after the misfire cylinder by the rotational fluctuation Nxd(3) of the misfire cylinder to calculate a rotational fluctuation ratio Nja4 (step S250). The engine electronic control unit 24 sequentially determines whether the calculated rotational fluctuation ratio Nja2 is in a range of second single misfire judgment values A21 and A22 (step S260), whether the calculated rotational fluctuation ratio Nja3 is in a range of third single misfire judgment values A31 and A32 (step S270), and whether the calculated rotational fluctuation ratio Nja4 is in a range of fourth single misfire judgment values A41 and A42 (step S280). The second single misfire judgment values A21 and A22, the third single misfire judgment values A31 and A32, and the fourth single misfire judgment values A41 and A42 are experimentally or otherwise set to define a range about the rotational fluctuation ratio Nja2, a range about the rotational fluctuation ratio Nja3, and a range about the rotational fluctuation ratio Nja4 in the occurrence of a single misfire. When the rotational fluctuation ratios Nja2, Nja3, and Nja4 are respectively in the range of the second single misfire judgment values A21 and A22, in the range of the third single misfire judgment values A31 and A32, and in the range of the fourth single misfire judgment values A41 and A42 (all of steps S260, S270, S280: Yes), the engine electronic control unit 24 determines the occurrence of a single misfire and outputs information on the occurrence of a single misfire (step S290), before terminating the single misfire identification process of FIG. 4. When the rotational fluctuation ratio Nja2 is out of the range of the second single misfire judgment values A21 and A22, when the rotational fluctuation ratio Nja3 is out of the range of the third single misfire judgment values A31 and A32, or when the rotational fluctuation ratio Nja4 is out of the range of the fourth single misfire judgment values A41 and A42 (one of steps S260, S270, S280: No), the engine electronic control unit 24 determines the non-occurrence of any single misfire and terminates the single misfire identification process of FIG. 4. FIG. 8 shows a time change of the rotational fluctuation Nxd in the occurrence of a single misfire. As clearly shown in FIG. 8, in the occurrence of a single misfire, only one cylinder in one cycle of the engine 22 has the rotational fluctuation Nxd distinctly exceeding the first single misfire judgment value A1. The procedure of this embodiment sets the first single misfire judgment value A1 as the criterion of distinct identification and identifies a single misfire pattern based on the rotational fluctuation ratios Nja2, Nja3, and Nja4. This arrangement thus ensures the adequate identification of a single misfire with high accuracy.

Figure 5:
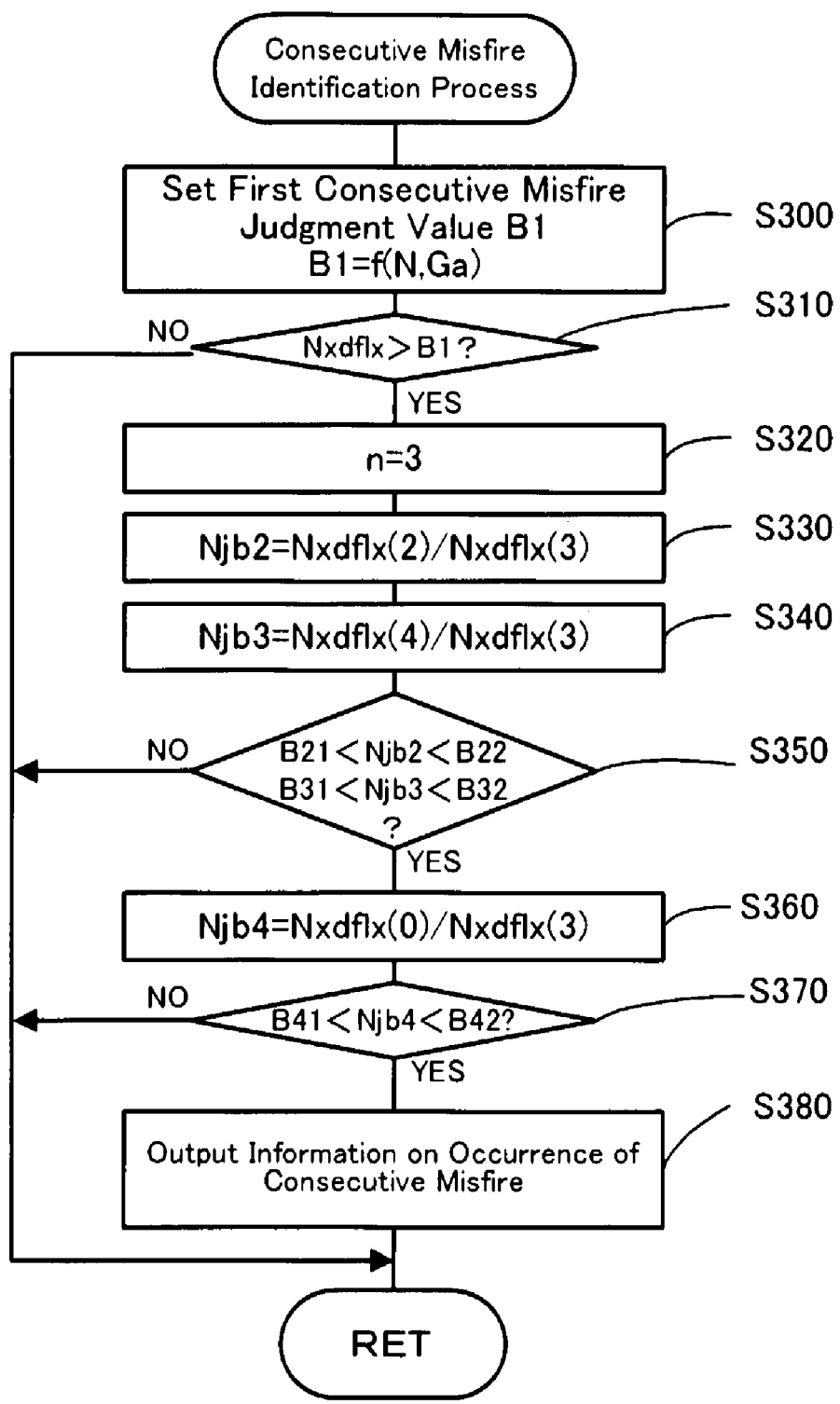
FIG. 5 is a flowchart showing the details of a consecutive misfire identification process in the engine misfire identification routine of FIG. 3.
Figure 9:
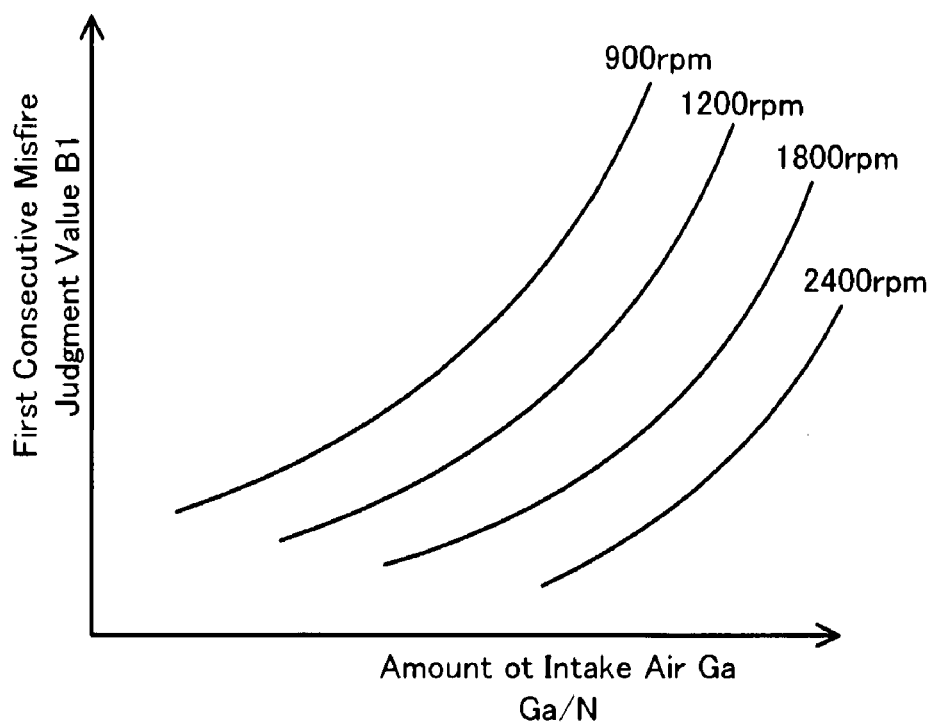
FIG. 9 shows variations in first consecutive misfire judgment value B1 against the amount of intake air Ga in each rotation of the crankshaft with regard to the various rotation speeds N of the crankshaft.
Figure 10:
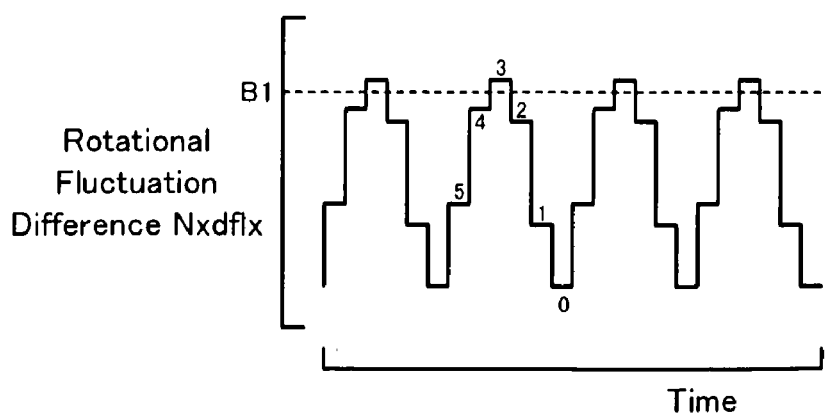
FIG. 10 shows a time change of a rotational fluctuation difference Nxdflx in the occurrence of consecutive misfires.

In the consecutive misfire identification process shown in the flowchart of FIG. 5, the engine electronic control unit 24 sets a first consecutive misfire judgment value B1 as one reference value for identifying consecutive misfires, based on the rotation speed N of the crankshaft 26 and the amount of intake air Ga (step S300). Like the first single misfire judgment value A1, the first consecutive misfire judgment value B1 is set to decrease with an increase in rotation speed N of the crankshaft 26 and to increase with an increase in amount of intake air Ga in each rotation of the crankshaft 26. FIG. 9 shows variations in first consecutive misfire judgment value B1 against the amount of intake air Ga in each rotation of the crankshaft 26 with regard to the various rotation speeds N of the crankshaft 26. The engine electronic control unit 24 then compares the calculated rotational fluctuation difference Nxdflx with the first consecutive misfire judgment value B1 (step S310). When the rotational fluctuation difference Nxdflx is not greater than the first consecutive misfire judgment value B1 at step S310, the engine electronic control unit 24 determines the non-occurrence of consecutive misfires and immediately terminates the consecutive misfire identification process of FIG. 5. When the rotational fluctuation difference Nxdflx is greater than the first consecutive misfire judgment value B1 at step S310, on the other hand, the engine electronic control unit 24 specifies a third cylinder among the six cylinders as a misfire cylinder with the greater rotational fluctuation difference Nxdflx (that is, Nxdflx(3)) (step S320). The engine electronic control unit 24 then divides a last rotational fluctuation difference Nxdflx(2) of a last cylinder immediately before the misfire cylinder by the rotational fluctuation difference Nxdflx(3) of the misfire cylinder to calculate a rotational fluctuation difference ratio Njb2 (step S330), and divides a next rotational fluctuation difference Nxdflx(4) of a next cylinder immediately after the misfire cylinder by the rotational fluctuation difference Nxdflx(3) of the misfire cylinder to calculate a rotational fluctuation difference ratio Njb3 (step S340). The engine electronic control unit 24 determines whether the calculated rotational fluctuation difference ratio Njb2 is in a range of second consecutive misfire judgment values B21 and B22 and whether the calculated rotational fluctuation difference ratio Njb3 is in a range of third consecutive misfire judgment values B31 and B32 (step S350). The second consecutive misfire judgment values B21 and B22 and the third consecutive misfire judgment values B31 and B32 are experimentally or otherwise set to define a range about the rotational fluctuation difference ratio Njb2 and a range about the rotational fluctuation difference ratio Njb3 in the occurrence of consecutive misfires. When the rotational fluctuation difference ratio Njb2 is out of the range of the second consecutive misfire judgment values B21 and B22 and when the rotational fluctuation difference ratio Njb3 is out of the range of the third consecutive misfire judgment values B31 and B32 (step S350: No), the engine electronic control unit 24 determines the non-occurrence of consecutive misfires and terminates the consecutive misfire identification process of FIG. 5. When the rotational fluctuation difference ratio Njb2 is in the range of the second consecutive misfire judgment values B21 and B22 or when the rotational fluctuation difference ratio Njb3 is in the range of the third consecutive misfire judgment values B31 and B32 (step S350: Yes), on the other hand, the engine electronic control unit 24 divides a third last rotational fluctuation difference Nxdflx(0) of a third last cylinder before the misfire cylinder by the rotational fluctuation difference Nxdflx (3) of the misfire cylinder to calculate a rotational fluctuation difference ratio Njb4 (step S360) and determines whether the calculated rotational fluctuation difference ratio Njb4 is in a range of fourth consecutive misfire judgment values B41 and B42 (step S370). The fourth consecutive misfire judgment values B41 and B42 are experimentally or otherwise set to define a range about the rotational fluctuation difference ratio Njb4 in the occurrence of consecutive misfires. When the rotational fluctuation difference ratio Njb4 is in the range of the fourth consecutive misfire judgment values B41 and B42 (step S370: Yes), the engine electronic control unit 24 determines the occurrence of consecutive misfires and outputs information on the occurrence of consecutive misfires (step S380), before terminating the consecutive misfire identification process of FIG. 5. When the rotational fluctuation difference ratio Njb4 is out of the range of the fourth consecutive misfire judgment values B41 and B42 (step S370: No), the engine electronic control unit 24 determines the non-occurrence of consecutive misfires and terminates the consecutive misfire identification process of FIG. 5. FIG. 10 shows a time change of the rotational fluctuation difference Nxdflx in the occurrence of consecutive misfires. As clearly shown in FIG. 10, in the occurrence of consecutive misfires, the rotational fluctuation difference Nxdflx of the misfire cylinder distinctly exceeds the first consecutive misfire judgment value B1. The procedure of this embodiment sets the first consecutive misfire judgment value B1 as the criterion of distinct identification and identifies a consecutive misfire pattern based on the rotational fluctuation difference ratios Njb2, Njb3, and Njb4. This arrangement thus ensures the adequate identification of consecutive misfires with high accuracy.

Figure 6:
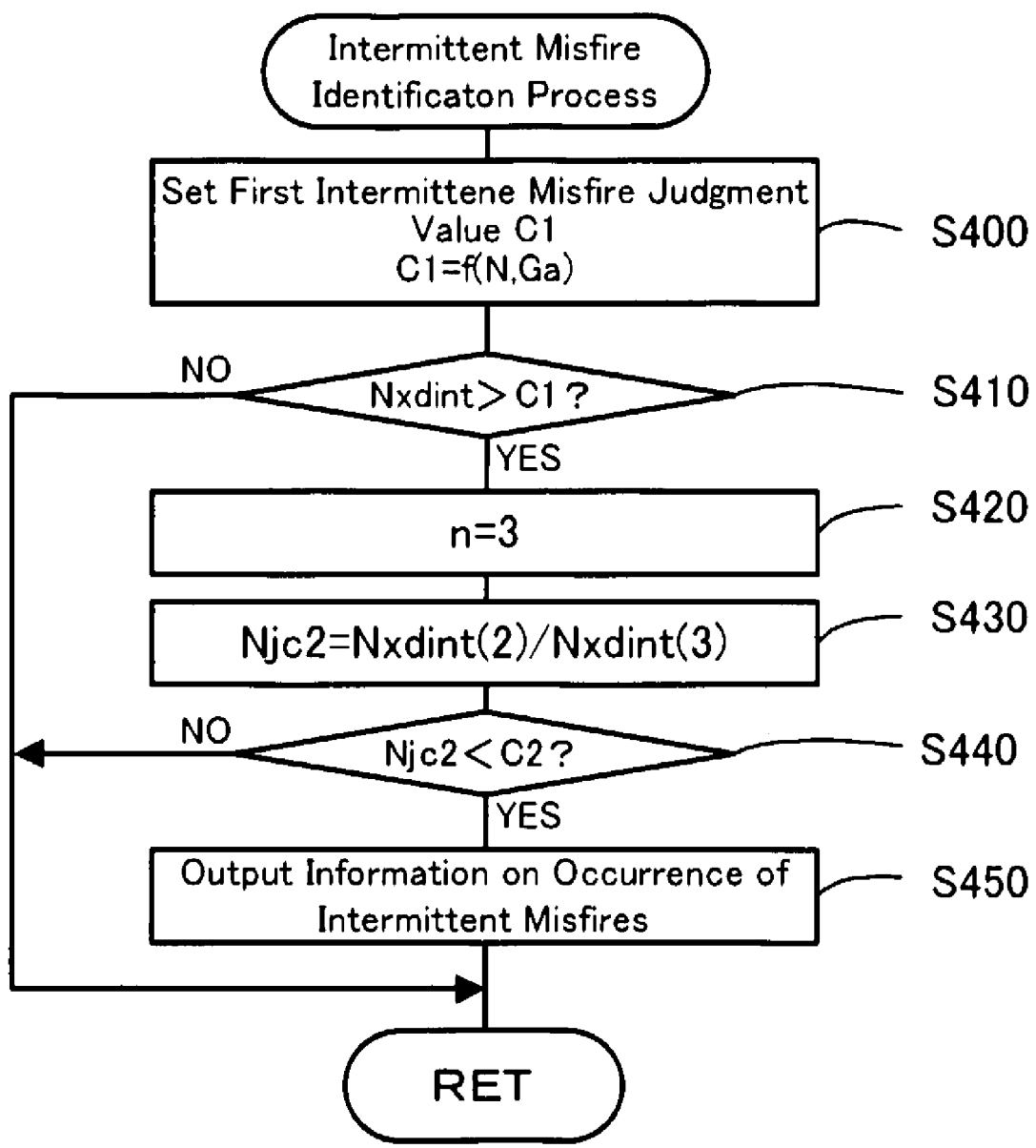
FIG. 6 is a flowchart showing the details of an intermittent misfire identification process in the engine misfire identification routine of FIG. 3.
Figure 11:
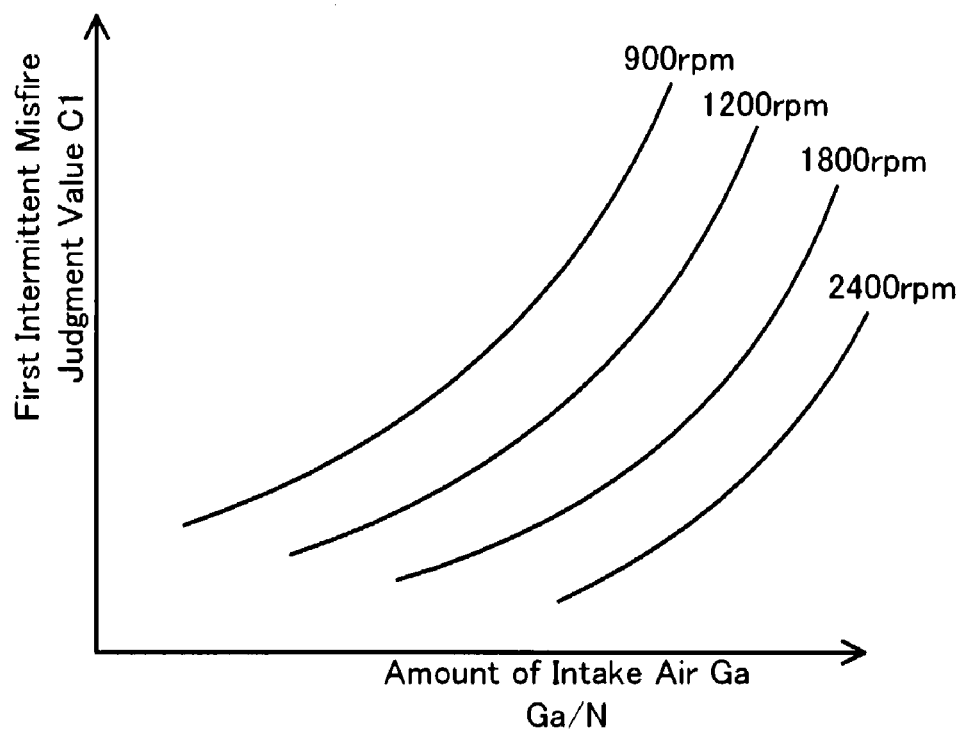
FIG. 11 shows variation in first intermittent misfire judgment value C1 against the amount of intake air Ga in each rotation of the crankshaft with regard to the various rotation speeds N of the crankshaft.
Figure 12:
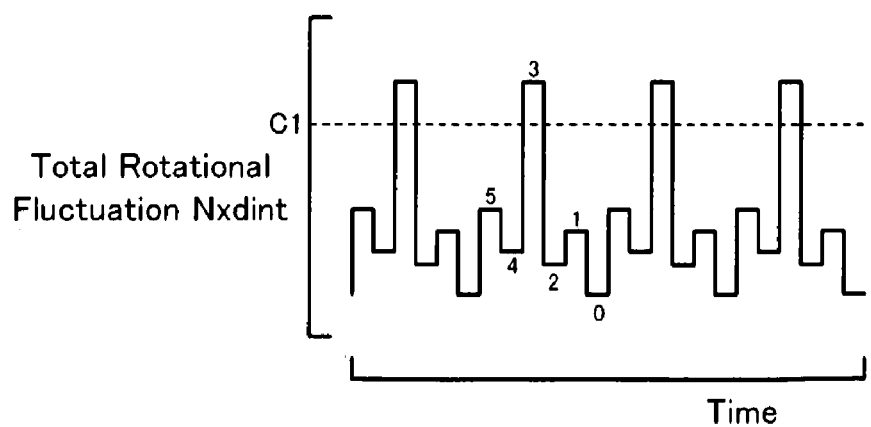
FIG. 12 shows a time change of a total rotational fluctuation Nxdint in the occurrence of intermittent misfires.

In the intermittent misfire identification process shown in the flowchart of FIG. 6, the engine electronic control unit 24 sets a first intermittent misfire judgment value C1 as one reference value for identifying intermittent misfires, based on the rotation speed N of the crankshaft 26 and the amount of intake air Ga (step S400). Like the first single misfire judgment value A1 and the first consecutive misfire judgment value B1, the first intermittent misfire judgment value C1 is set to decrease with an increase in rotation speed N of the crankshaft 26 and to increase with an increase in amount of intake air Ga in each rotation of the crankshaft 26. FIG. 11 shows variations in first intermittent misfire judgment value C1 against the amount of intake air Ga in each rotation of the crankshaft 26 with regard to the various rotation speeds N of the crankshaft 26. The engine electronic control unit 24 then compares the calculated total rotational fluctuation Nxdint with the first intermittent misfire judgment value C1 (step S410). When the total rotational fluctuation Nxdint is not greater than the first intermittent misfire judgment value C1 at step S410, the engine electronic control unit 24 determines the non-occurrence of intermittent misfires and immediately terminates the intermittent misfire identification process of FIG. 6. When the total rotational fluctuation Nxdint is greater than the first intermittent misfire judgment value C1 at step S410, on the other hand, the engine electronic control unit 24 specifies a third cylinder among the six cylinders as a misfire cylinder with the greater total rotational fluctuation Nxdint (that is, Nxdint(3)) (step S420). The engine electronic control unit 24 then divides a last total rotational fluctuation Nxdint (2) of a last cylinder immediately before the misfire cylinder by the total rotational fluctuation Nxdint(3) of the misfire cylinder to calculate a total rotational fluctuation ratio Njc2 (step S430), and determines whether the calculated total rotational fluctuation ratio Njc2 is less than a preset second intermittent misfire judgment value C2 (step S440). The second intermittent misfire judgment value C2 is experimentally or otherwise set to be greater than the total rotational fluctuation ratio Njc2 in the occurrence of intermittent misfires and to be less than the total rotational fluctuation ratio Njc2 in the non-occurrence of intermittent misfires. When the total rotational fluctuation ratio Njc2 is less than the preset second intermittent misfire judgment value C2 (step S440: Yes), the engine electronic control unit 24 determines the occurrence of intermittent misfires and outputs information on the occurrence of intermittent misfires (step S450), before terminating the intermittent misfire identification process of FIG. 6. When the total rotational fluctuation ratio Njc2 is not less than the preset second intermittent misfire judgment value C2 (step S440: No), the engine electronic control unit 24 determines the non-occurrence of intermittent misfires and terminates the intermittent misfire identification process of FIG. 6. FIG. 12 shows a time change of the total rotational fluctuation Nxdint in the occurrence of intermittent misfires. As clearly shown in FIG. 12, in the occurrence of intermittent misfires, the total rotational fluctuation Nxdint of the misfire cylinder distinctly exceeds the first intermittent misfire judgment value C1. The procedure of this embodiment sets the first intermittent misfire judgment value C1 as the criterion of distinct identification and identifies an intermittent misfire pattern based on the total rotational fluctuation ratio Njc2. This arrangement thus ensures the adequate identification of intermittent misfires with high accuracy.

As described above, the engine misfire identification device mounted on the hybrid vehicle 20 of the embodiment performs the single misfire identification process, the consecutive misfire identification process, and the intermittent misfire identification process with the rotational fluctuation Nxd, the rotational fluctuation difference Nxdflx, and the total rotational fluctuation Nxdint to adequately and accurately identify a single misfire, consecutive misfires, and intermittent misfires. The engine misfire identification device of the embodiment uses multiple different misfire judgment logics corresponding to multiple different misfire patterns to identify the misfires of the engine 22. This arrangement thus adequately and accurately identifies the occurrence and the pattern of misfires in the engine 22.

The engine misfire identification device mounted on the hybrid vehicle 20 of the embodiment distinctly and adequately identifies a single misfire with high accuracy, based on the rotational fluctuation Nxd calculated as the variation in rotation speed N of the crankshaft 26 at the crank angle CA of every 120 degrees corresponding to the ignition timing in each cylinder of the engine 22. The first single misfire judgment value A1 is set corresponding to the rotation speed N of the crankshaft 26 and the amount of intake air Ga in each rotation of the crankshaft 26. The use of this first single misfire judgment value A1 ensures the adequate and accurate identification of a single misfire. The engine misfire identification device mounted on the hybrid vehicle 20 of the embodiment identifies the single misfire pattern, based on the rotational fluctuation ratio Nja2 of the third last rotational fluctuation Nxd(0) to the rotational fluctuation Nxd(3) exceeding the first single misfire judgment value A1, the rotational fluctuation ratio Nja3 of the last rotational fluctuation Nxd(2) to the rotational fluctuation Nxd(3), and the rotational fluctuation ratio Nja4 of the next rotational fluctuation Nxd(4) to the rotational fluctuation Nxd(3). This arrangement ensures the adequate and accurate identification of a single misfire and allows an adequate countermeasure to be taken against the identified single misfire.

The engine misfire identification device mounted on the hybrid vehicle 20 of the embodiment distinctly and adequately identifies consecutive misfires with high accuracy, based on the rotational fluctuation difference Nxdflx calculated as the difference between the rotational fluctuations Nxd at the interval of the crank angle CA of 360 degrees, where the rotational fluctuation Nxd represents the variation in rotation speed N of the crankshaft 26 at the crank angle CA of every 120 degrees corresponding to the ignition timing in each cylinder of the engine 22. The first consecutive misfire judgment value B1 is set corresponding to the rotation speed N of the crankshaft 26 and the amount of intake air Ga in each rotation of the crankshaft 26. The use of this first consecutive misfire judgment value B1 ensures the adequate and accurate identification of consecutive misfires. The engine misfire identification device mounted on the hybrid vehicle 20 of the embodiment identifies the consecutive misfire pattern, based on the rotational fluctuation difference ratio Njb2 of the last rotational fluctuation difference Nxdflx(2) to the rotational fluctuation difference Nxdflx(3) exceeding the first consecutive misfire judgment value B1, the rotational fluctuation difference ratio Njb3 of the next rotational fluctuation difference Nxdflx(4) to the rotational fluctuation difference Nxdflx(3), and the rotational fluctuation difference ratio Njb4 of the third last rotational fluctuation difference Nxdflx(0) to the rotational fluctuation difference Nxdflx(3). This arrangement ensures the adequate and accurate identification of consecutive misfires and allows an adequate countermeasure to be taken against the identified consecutive misfires.

The engine misfire identification device mounted on the hybrid vehicle 20 of the embodiment distinctly and adequately identifies intermittent misfires with high accuracy, based on the total rotational fluctuation Nxdint calculated as the sum of the rotational fluctuations Nxd at the interval of the crank angle CA of 360 degrees, where the rotational fluctuation Nxd represents the variation in rotation speed N of the crankshaft 26 at the crank angle CA of every 120 degrees corresponding to the ignition timing in each cylinder of the engine 22. The first intermittent misfire judgment value C1 is set corresponding to the rotation speed N of the crankshaft 26 and the amount of intake air Ga in each rotation of the crankshaft 26. The use of this first intermittent misfire judgment value C1 ensures the adequate and accurate identification of intermittent misfires. The engine misfire identification device mounted on the hybrid vehicle 20 of the embodiment identifies the intermittent misfire pattern, based on the total rotational fluctuation ratio Njc2 of the last total rotational fluctuation Nxdint(2) to the total rotational fluctuation Nxdint(3) exceeding the first intermittent misfire judgment value C1. This arrangement ensures the adequate and accurate identification of intermittent misfires and allows an adequate countermeasure to be taken against the identified intermittent misfires.

The engine misfire identification device mounted on the hybrid vehicle 20 of the embodiment performs the single misfire identification process, the consecutive misfire identification process, and the intermittent misfire identification process with the rotational fluctuation Nxd, the rotational fluctuation difference Nxdflx, and the total rotational fluctuation Nxdint to identify a single misfire, consecutive misfires, and intermittent misfires. The misfire judgment logics adopted by the engine misfire identification device for identification of misfires are not restricted to the single misfire identification process, the consecutive misfire identification process, or the intermittent misfire identification process but may be diversity of other misfire judgment logics corresponding to diversity of other misfire patterns. The use of all these misfire judgment logics for identification of misfires is not essential. One modified procedure may adopt only part of these misfire judgment logics and execute only some of the single misfire identification process, the consecutive misfire identification process, and the intermittent misfire identification process to identify misfires.

The engine misfire identification device mounted on the hybrid vehicle 20 of the embodiment calculates the rotational fluctuation Nxd at the crank angle CA of every 120 degrees corresponding to the ignition timing in each cylinder of the engine 22 as the variation in rotation speed N of the crankshaft 26 computed at the crank angle CA of every 60 degrees. The rotational fluctuation Nxd may be calculated as a variation in rotation speed N of the crankshaft 26 computed at the crank angle CA of every preset degrees. The rotational fluctuation Nxd may otherwise be calculated as an angular acceleration at the crank angle CA of every 120 degrees corresponding to the ignition timing in each cylinder of the engine 22.

The single misfire identification process executed by the engine misfire identification device mounted on the hybrid vehicle 200 of the embodiment sets the first single misfire judgment value A1 corresponding to the rotation speed N of the crankshaft 26 and the amount of intake air Ga in each rotation of the crankshaft 26 and uses this first single misfire judgment value A1 to identify a single misfire. The first single misfire judgment value A1 used for identification of a single misfire may be set only corresponding to the amount of intake air Ga in each rotation of the crankshaft 26 regardless of the rotation speed N of the crankshaft 26 or may alternatively be set only corresponding to the rotation speed N of the crankshaft 26 regardless of the amount of intake air Ga in each rotation of the crankshaft 26. The first single misfire judgment value A1 used for identification of a single misfire may otherwise be set regardless of the rotation speed N of the crankshaft 26 and the amount of intake air Ga in each rotation of the crankshaft 26.

The single misfire identification process executed by the engine misfire identification device mounted on the hybrid vehicle 20 of the embodiment identifies the single misfire pattern, based on the rotational fluctuation ratio Nja2 of the third last rotational fluctuation Nxd(0) to the rotational fluctuation Nxd(3) exceeding the first single misfire judgment value A1, the rotational fluctuation ratio Nja3 of the last rotational fluctuation Nxd(2) to the rotational fluctuation Nxd(3), and the rotational fluctuation ratio Nja4 of the next rotational fluctuation Nxd(4) to the rotational fluctuation Nxd(3). The use of all these rotational fluctuation ratios Nja2, Nja3, and Nja4 for identification of the single misfire pattern is not essential. The identification of the single misfire pattern may be based on only some of these rotational fluctuation ratios Nja2, Nja3, and Nja4 or may not use any of these rotational fluctuation ratios Nja2, Nja3, and Nja4. Another possible modification may use one or multiple different rotational fluctuation ratios other than these rotational fluctuation ratios Nja2, Nja3, and Nja4 to identify the single misfire pattern.

The consecutive misfire identification process executed by the engine misfire identification device mounted on the hybrid vehicle 20 of the embodiment sets the first consecutive misfire judgment value B1 corresponding to the rotation speed N of the crankshaft 26 and the amount of intake air Ga in each rotation of the crankshaft 26 and uses this first consecutive misfire judgment value B1 to identify consecutive misfires. The first consecutive misfire judgment value B1 used for identification of consecutive misfires may be set only corresponding to the amount of intake air Ga in each rotation of the crankshaft 26 regardless of the rotation speed N of the crankshaft 26 or may alternatively be set only corresponding to the rotation speed N of the crankshaft 26 regardless of the amount of intake air Ga in each rotation of the crankshaft 26. The first consecutive misfire judgment value B1 used for identification of consecutive misfires may otherwise be set regardless of the rotation speed N of the crankshaft 26 and the amount of intake air Ga in each rotation of the crankshaft 26.

The consecutive misfire identification process executed by the engine misfire identification device mounted on the hybrid vehicle 20 of the embodiment identifies the consecutive misfire pattern, based on the rotational fluctuation difference ratio Njb2 of the last rotational fluctuation difference Nxdflx(2) to the rotational fluctuation difference Nxdflx(3) exceeding the first consecutive misfire judgment value B1, the rotational fluctuation difference ratio Njb3 of the next rotational fluctuation difference Nxdflx(4) to the rotational fluctuation difference Nxdflx(3), and the rotational fluctuation difference ratio Njb4 of the third last rotational fluctuation difference Nxdflx(0) to the rotational fluctuation difference Nxdflx(3). The use of all these rotational fluctuation difference ratios Njb2, Njb3, and Njb4 for identification of the consecutive misfire pattern is not essential. The identification of the consecutive misfire pattern may be based on only some of these rotational fluctuation difference ratios Njb2, Njb3, and Njb4 or may not use any of these rotational fluctuation difference ratios Njb2, Njb3, and Njb4. Another possible modification may use one or multiple different rotational fluctuation difference ratios other than these rotational fluctuation difference ratios Njb2, Njb3, and Njb4 to identify the consecutive misfire pattern.

The intermittent misfire identification process executed by the engine misfire identification device mounted on the hybrid vehicle 20 of the embodiment sets the first intermittent misfire judgment value C1 corresponding to the rotation speed N of the crankshaft 26 and the amount of intake air Ga in each rotation of the crankshaft 26 and uses this first intermittent misfire judgment value C1 to identify intermittent misfires. The first intermittent misfire judgment value C1 used for identification of intermittent misfires may be set only corresponding to the amount of intake air Ga in each rotation of the crankshaft 26 regardless of the rotation speed N of the crankshaft 26 or may alternatively be set only corresponding to the rotation speed N of the crankshaft 26 regardless of the amount of intake air Ga in each rotation of the crankshaft 26. The first intermittent misfire judgment value C1 used for identification of intermittent misfires may otherwise be set regardless of the rotation speed N of the crankshaft 26 and the amount of intake air Ga in each rotation of the crankshaft 26.

The intermittent misfire identification process executed by the engine misfire identification device mounted on the hybrid vehicle 20 of the embodiment identifies the intermittent misfire pattern, based on the total rotational fluctuation ratio Njc2 of the last total rotational fluctuation Nxdint(2) to the total rotational fluctuation Nxdint(3) exceeding the first intermittent misfire judgment value C1. The use of this total rotational fluctuation ratio Njc2 for identification of the intermittent misfire pattern is not essential. Another possible modification may use a different total rotational fluctuation ratio other than the total rotational fluctuation ratio Njc2 to identify the intermittent misfire pattern.

A hybrid vehicle 20B equipped with an engine misfire identification device is described below as a second embodiment of the invention. The hybrid vehicle 20B and the engine misfire identification device of the second embodiment have the identical hardware configurations with those of the hybrid vehicle 20 and the engine misfire identification device of the first embodiment described previously with reference to FIGS. 1 and 2. The like elements in the hybrid vehicle 20B and the engine misfire identification device of the second embodiment to those in the hybrid vehicle 20 and the engine misfire identification device of the first embodiment are expressed by the like numerals and symbols and are not specifically described here.

Figure 13:
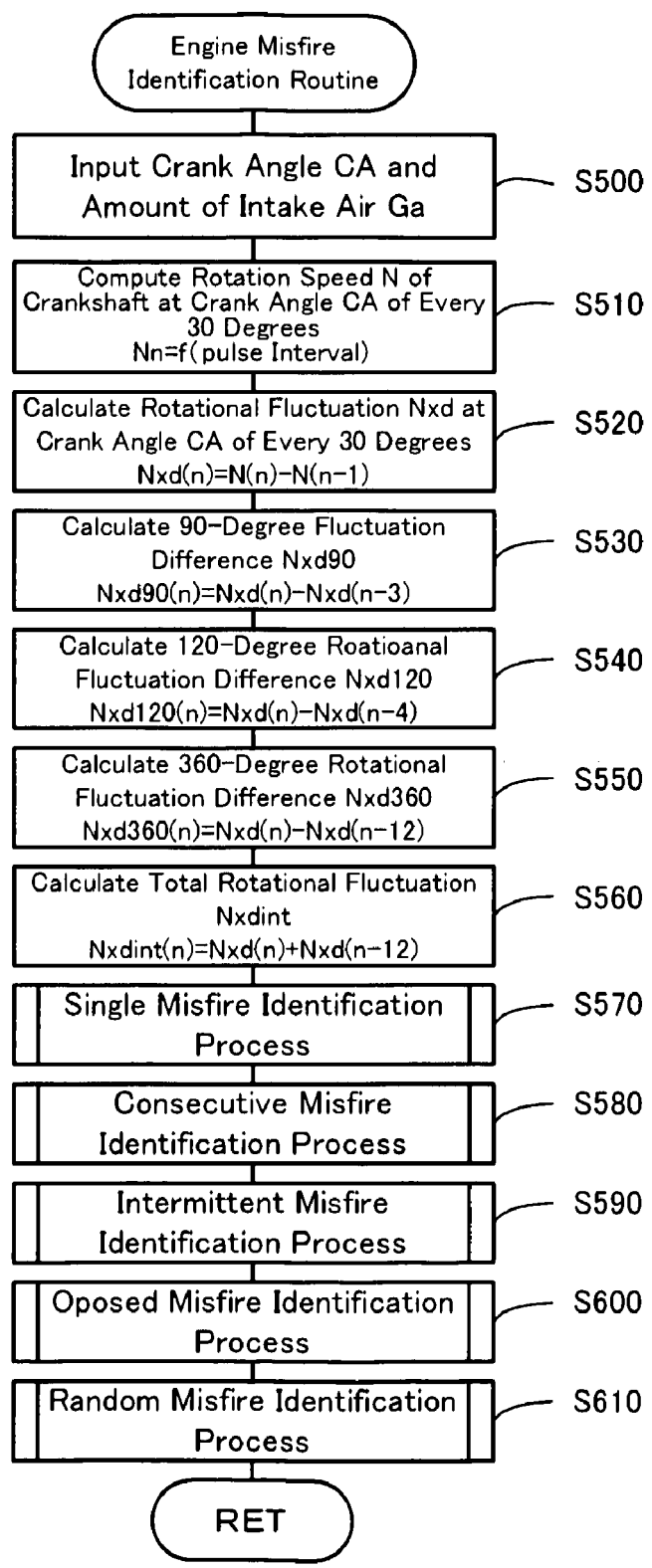
FIG. 13 is a flowchart showing an engine misfire identification routine executed by the engine electronic control unit in a second embodiment of the invention.

The description regards the operations of the hybrid vehicle 20B of the second embodiment constructed as discussed above, especially a series of control executed by the engine electronic control unit 24 to identify misfires of the engine 22. In the structure of the second embodiment, the engine electronic control unit 24 executes an engine misfire identification routine shown in the flowchart of FIG. 13, instead of the engine misfire identification routine of FIG. 3. In the engine misfire identification routine, the engine electronic control unit 24 inputs data required for identification of misfires, that is, the crank angle CA from the crank angle sensor 140 and the amount of intake air Ga from the vacuum sensor 148 (step S500). The engine electronic control unit 24 computes the rotation speed N of the crankshaft 26 at every specific crank angle CA, that is, at every 30 degrees, from the input crank angle CA (step S510), and calculates a rotational fluctuation Nxd at the crank angle CA of every 30 degrees as a difference between the rotation speeds N at the interval of the crank angle CA of 30 degrees (step S520). The engine electronic control unit 24 calculates differences of a rotational fluctuation Nxd at the crank angle CA of 90 degrees before a specific crank angle CA, a rotational fluctuation Nxd at the crank angle CA of 120 degrees before the specific crank angle CA, and a rotational fluctuation Nxd at the crank angle CA of 360 degrees before the specific crank angle CA from a specific rotational fluctuation Nxd at the specific crank angle CA corresponding to the ignition timing in each cylinder of the engine 22, as a 90-degree rotational fluctuation difference Nxd90, a 120-degree rotational fluctuation difference Nxd120, and a 360-degree rotational fluctuation difference Nxd360 (steps S530 to S550). The engine electronic control unit 24 also sums up the specific rotational fluctuation Nxd at the specific crank angle CA corresponding to the ignition timing in each cylinder of the engine 22 and the rotational fluctuation Nxd at the crank angle CA of 360 degrees before the specific crank angle CA, as a total rotational fluctuation Nxdint (step S560). The rotational fluctuation Nxd is calculated at the crank angle CA of every 30 degrees. The rotational fluctuations Nxd at the crank angles CA of 90 degrees, 120 degrees, and 360 degrees before the specific crank angle CA are accordingly obtained by the third last calculation, the fourth last calculation, and twelfth last calculation. In the flowchart of FIG. 13, the specific rotational fluctuation Nxd at the specific crank angle CA and the rotational fluctuations Nxd at the crank angles CA of 90 degrees, 120 degrees, and 360 degrees before the specific crank angle CA are expressed respectively as Nxd(n), Nxd(n-3), Nxd(n-4), and Nxd(n-12).

After calculation of the rotational fluctuation Nxd, the rotational fluctuation differences Nxd90, Nxd120, and Nxd360, and the total rotational fluctuation Nxdint, the engine electronic control unit 24 sequentially performs a single misfire identification process (step S570), a consecutive misfire identification process (step S580), an intermittent misfire identification process (step S590), an opposed misfire identification process (step S600), and a random misfire identification process (step S610) with these calculated values to detect a single misfire, consecutive misfires, intermittent misfires, opposed misfires, or a random misfire if any and exits from the engine misfire identification routine of FIG. 13. The single misfire identification process of step S570 identifies a single misfire pattern where only one of the six cylinders has a misfire, and is performed according to the flowchart of FIG. 4. The consecutive misfire identification process of step S580 identifies a consecutive misfire pattern where two consecutive cylinders among the six cylinders have misfires, and is performed according to the flowchart of FIG. 5. The intermittent misfire identification process of step S590 identifies an intermittent misfire pattern where two non-consecutive cylinders across one combustion cylinder among the six cylinders have misfires, and is performed according to the flowchart of FIG. 6. The opposed misfire identification process of step S600 identifies an opposed misfire pattern where two opposed cylinders among the six cylinders have misfires, and is performed according to the flowchart of FIG. 14. The random misfire identification process of step S610 identifies a random misfire pattern where one cylinder among the six cylinders has a misfire irregularly in one cycle of the engine 22, and is performed according to the flowchart of FIG. 15. Among these misfire identification processes, the single misfire identification process, the consecutive misfire identification process, and the intermittent misfire identification process follow the flowcharts of FIGS. 4 through 6 discussed above with the different settings of the crank angle CA for calculation of the rotation speed N and the rotational fluctuation Nxd, and are thus not described here. The details of the opposed misfire identification process and the random misfire identification process are sequentially described below with reference to the flowcharts of FIGS. 14 and 15.

Figure 14:
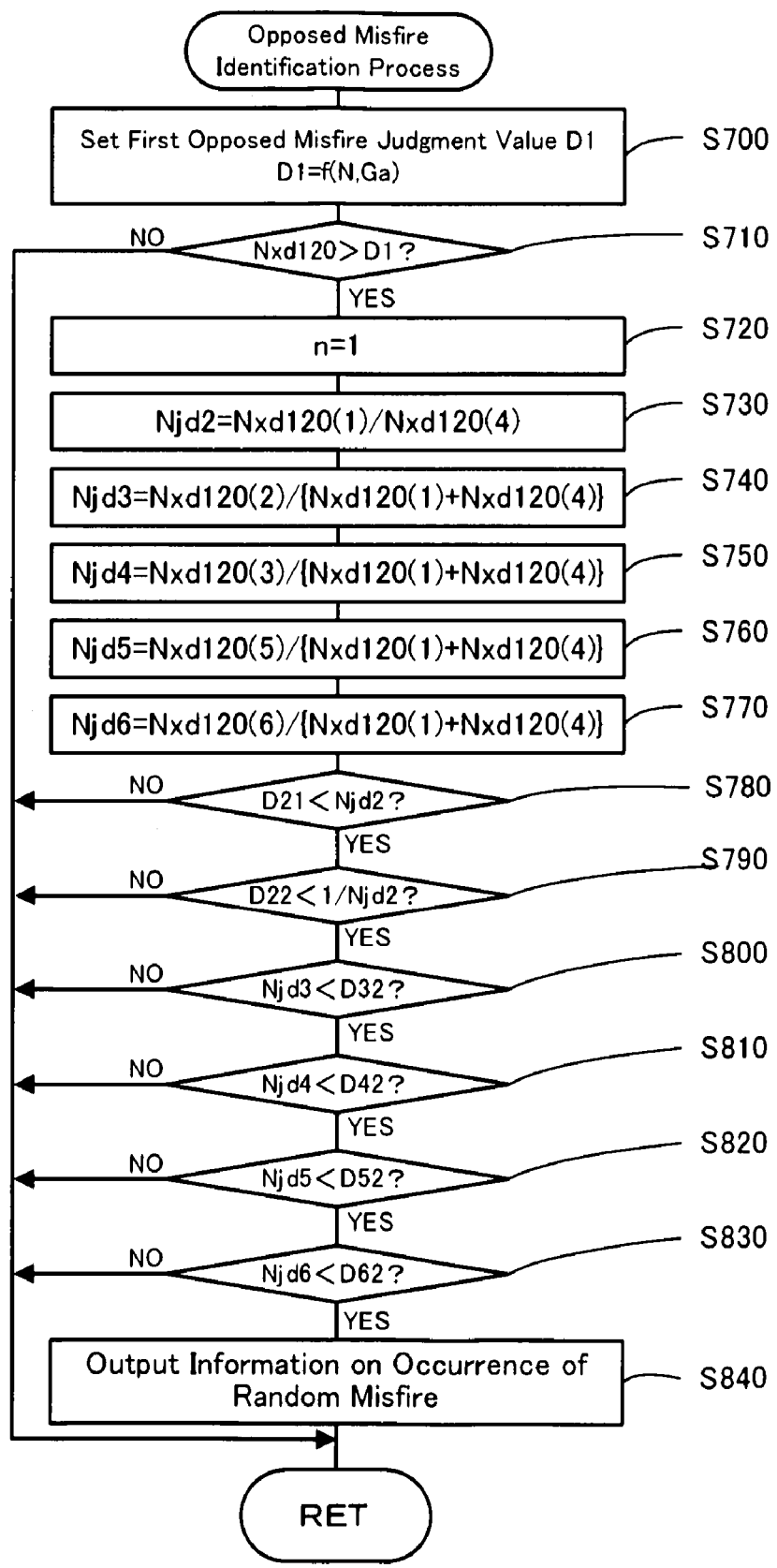
FIG. 14 is a flowchart showing the details of an opposed misfire identification process in the engine misfire identification routine of FIG. 13.
Figure 16:
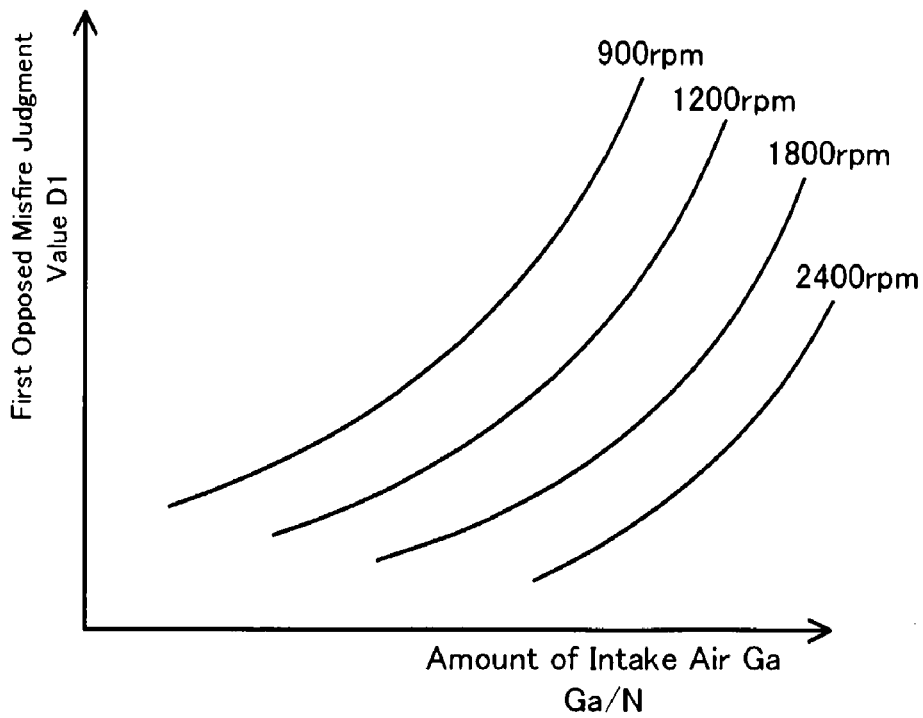
FIG. 16 shows variations in first opposed misfire judgment value D1 against the amount of intake air Ga in each rotation of the crankshaft with regard to the various rotation speeds N of the crankshaft.
Figure 17:
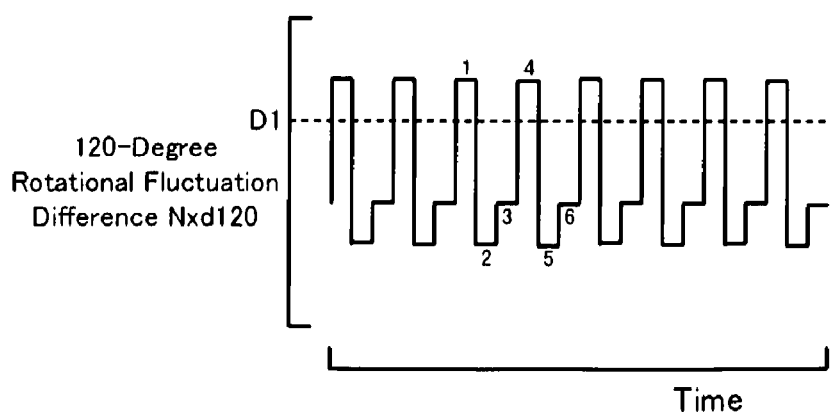
FIG. 17 shows a time change of a 120-degree rotational fluctuation difference Nxd120 in the occurrence of opposed misfires.

In the opposed misfire identification process shown in the flowchart of FIG. 14, the engine electronic control unit 24 sets a first opposed misfire judgment value D1 as one reference value for identifying opposed misfires, based on the rotation speed N of the crankshaft 26 and the amount of intake air Ga (step S700). Like the first single misfire judgment value A1 described above, the first opposed misfire judgment value D1 is set to decrease with an increase in rotation speed N of the crankshaft 26 and to increase with an increase in amount of intake air Ga in each rotation of the crankshaft 26. FIG. 16 shows variations in first opposed misfire judgment value D1 against the amount of intake air Ga in each rotation of the crankshaft 26 with regard to the various rotation speeds N of the crankshaft 26. The engine electronic control unit 24 then compares the calculated 120-degree rotational fluctuation difference Nxd120 with the first opposed misfire judgment value D1 (step S710). When the 120-degree rotational fluctuation difference Nxd120 is not greater than the first opposed misfire judgment value D1 at step S710, the engine electronic control unit 24 determines the non-occurrence of opposed misfires and immediately terminates the opposed misfire identification process of FIG. 14. When the 120-degree rotational fluctuation difference Nxd120 is greater than the first opposed misfire judgment value D1 at step S710, on the other hand, the engine electronic control unit 24 specifies a first cylinder among the six cylinders as a misfire cylinder with the greater 120-degree rotational fluctuation difference Nxd120 (that is, Nxd120(1)) (step S720). The engine electronic control unit 24 also specifies a third next cylinder after the misfire cylinder as another misfire cylinder and divides the 120-degree rotational fluctuation difference Nxd120(1) of the misfire cylinder by a 120-degree rotational fluctuation difference Nxd120(4) of the another misfire cylinder to calculate a rotational fluctuation difference ratio Njd2 (step S730). The engine electronic control unit 24 sequentially divides a next 120-degree rotational fluctuation difference Nxd120(2) and a second next 120-degree rotational fluctuation difference Nxd120(3) of a next cylinder and a second next cylinder after the misfire cylinder and a next 120-degree rotational fluctuation difference Nxd120(5) and a second next 120-degree rotational fluctuation difference Nxd120(6) of a next cylinder and a second next cylinder after the another misfire cylinder by the sum of the 120-degree rotational fluctuation differences Nxd120(1) and Nxd120(4) of the two misfire cylinders, as rotational fluctuation difference ratios Njd3, Njd4, Njd5, and Njd6 (steps S740 to S770). The engine electronic control unit 24 successively determines whether the calculated rotational fluctuation difference ratio Njd2 is greater than a preset second opposed misfire judgment value D21 (step S780) and whether the reciprocal of the rotational fluctuation difference ratio Njd2 is greater than a preset second opposed misfire judgment value D22 (step S790). The engine electronic control unit 24 then sequentially determines whether the calculated rotational fluctuation difference ratios Njd3, Njd4, Njd5, and Njd6 are respectively less than a preset third opposed misfire judgment value D32, a preset fourth opposed misfire judgment value D42, a preset fifth opposed misfire judgment value D52, and a preset sixth opposed misfire judgment value D62 (steps S800 to S830). The second opposed misfire judgment values D21 and D22 are experimentally or otherwise set to be smaller than the rotational fluctuation difference ratio Njd2 and to be smaller than the reciprocal of the rotational fluctuation difference ratio Njd2 in the occurrence of opposed misfires. The third opposed misfire judgment value D32, the fourth opposed misfire judgment value D42, the fifth opposed misfire judgment value D52, and the sixth opposed misfire judgment value D62 are experimentally or otherwise set to be smaller than the corresponding rotational fluctuation difference ratios Njd3 to Njd6 in the occurrence of opposed fires. When the rotational fluctuation difference ratio Njd2 is not greater than the second opposed misfire judgment value D21, when the reciprocal of the rotational fluctuation difference ratio Njd2 is not greater than the second opposed misfire judgment value D22, or when any of the rotational fluctuation difference ratios Njd3 to Njd6 is not less than the corresponding third opposed misfire judgment value D32, the corresponding fourth opposed misfire judgment value D42, the corresponding fifth opposed misfire judgment value D52, or the corresponding sixth opposed misfire judgment value D62 (one of steps S780 to S830: No), the engine electronic control unit 24 determines the non-occurrence of opposed misfires and terminates the opposed misfire identification process of FIG. 14. When the rotational fluctuation difference ratio Njd2 is greater than the second opposed misfire judgment value D21, when the reciprocal of the rotational fluctuation difference ratio Njd2 is greater than the second opposed misfire judgment value D22, and when all of the rotational fluctuation difference ratios Njd3 to Njd6 are less than the corresponding third opposed misfire judgment value D32, the corresponding fourth opposed misfire judgment value D42, the corresponding fifth opposed misfire judgment value D52, and the corresponding sixth opposed misfire judgment value D62 (all of steps S780 to S830: Yes), on the other hand, the engine electronic control unit 24 determines the occurrence of opposed misfires and outputs information on the occurrence of opposed misfires (step S840), before terminating the opposed misfire identification process of FIG. 14. FIG. 17 shows a time change of the 120-degree rotational fluctuation difference Nxd120 in the occurrence of opposed misfires. As clearly shown in FIG. 17, in the occurrence of opposed misfires, the 120-degree rotational fluctuation differences Nxd120 of the misfire cylinders distinctly exceed the first opposed misfire judgment value D1. The procedure of this embodiment sets the first opposed misfire judgment value D1 as the criterion of distinct identification and identifies an opposed misfire pattern based on the rotational fluctuation difference ratio Njd2 and its reciprocal and the rotational fluctuation difference ratios Njd3 to Njd6. This arrangement thus ensures the adequate identification of opposed misfires with high accuracy.

Figure 15:
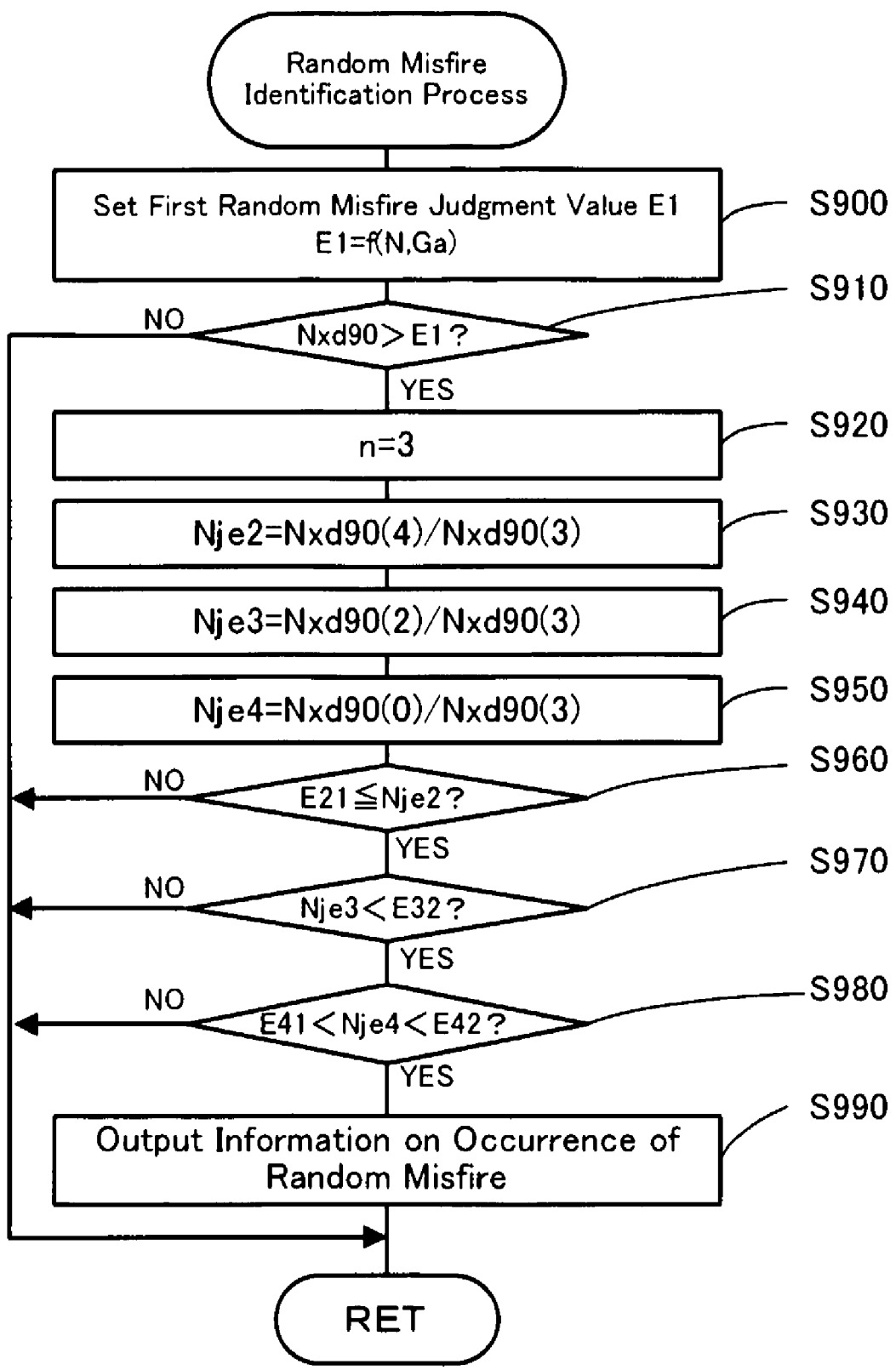
FIG. 15 is a flowchart showing the details of a random misfire identification process in the engine misfire identification routine of FIG. 13.
Figure 18:
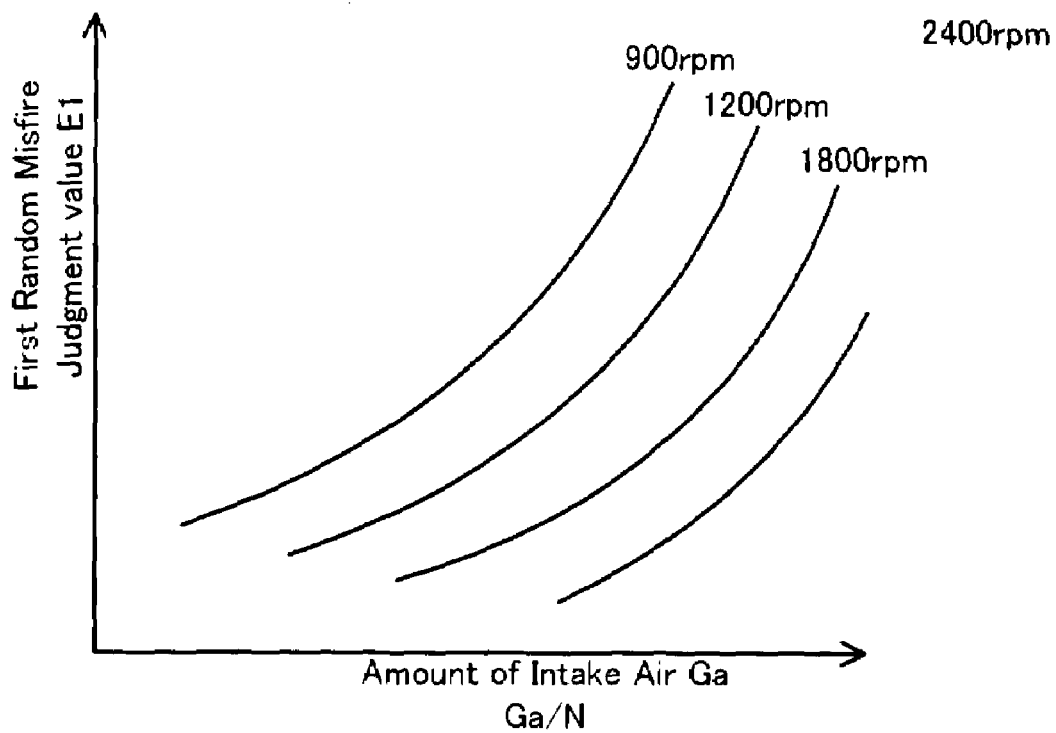
FIG. 18 shows variations in first random misfire judgment value E1 against the amount of intake air Ga in each rotation of the crankshaft with regard to the various rotation speeds N of the crankshaft.
Figure 19:
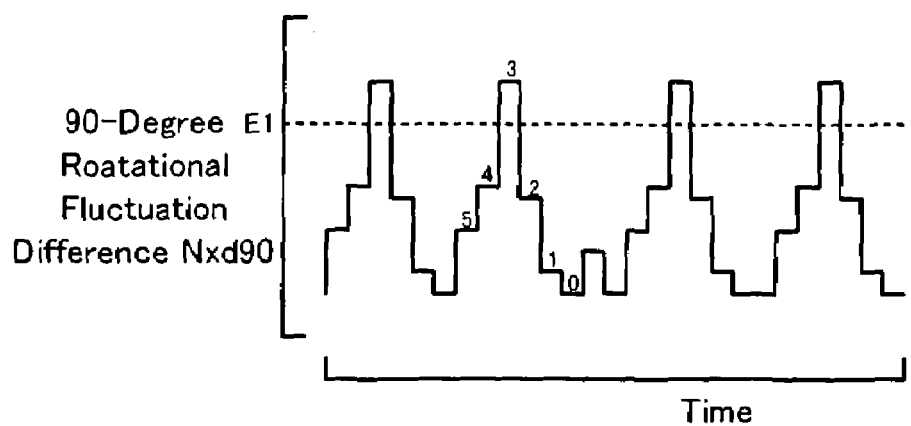
FIG. 19 shows a time change of a 90-degree rotational fluctuation difference Nxd90 in the occurrence of random misfires.

In the random misfire identification process shown in the flowchart of FIG. 15, the engine electronic control unit 24 sets a first random misfire judgment value E1 as one reference value for identifying a random misfire, based on the rotation speed N of the crankshaft 26 and the amount of intake air Ga (step S900). Like the first single misfire judgment value A1 described above, the first random misfire judgment value E1 is set to decrease with an increase in rotation speed N of the crankshaft 26 and to increase with an increase in amount of intake air Ga in each rotation of the crankshaft 26. FIG. 18 shows variations in first random misfire judgment value E1 against the amount of intake air Ga in each rotation of the crankshaft 26 with regard to the various rotation speeds N of the crankshaft 26. The engine electronic control unit 24 then compares the calculated 90-degree rotational fluctuation difference Nxd90 with the first random misfire judgment value E1 (step S910). When the 90-degree rotational fluctuation difference Nxd90 is not greater than the first random misfire judgment value E1 at step S910, the engine electronic control unit 24 determines the non-occurrence of a random misfire and immediately terminates the random misfire identification process of FIG. 15. When the 90-degree rotational fluctuation difference Nxd90 is greater than the first random misfire judgment value E1 at step S910, on the other hand, the engine electronic control unit 24 specifies a third cylinder among the six cylinders as a misfire cylinder with the greater 90-degree rotational fluctuation difference Nxd90 (that is, Nxd90(3)) (step S920). The engine electronic control unit 24 sequentially divides a next 90-degree rotational fluctuation difference Nxd90(4) of a next cylinder immediately after the misfire cylinder, a last 90-degree rotational fluctuation difference Nxd90(2) of a last cylinder immediately before the misfire cylinder, and a third last 90-degree rotational fluctuation difference Nxd90(0) of a third last cylinder before the misfire cylinder by the 90-degree rotational fluctuation difference Nxd90(3) of the misfire cylinder, as rotational fluctuation difference ratios Nje2, Nje3, and Nje4 (steps S930 to S950). The engine electronic control unit 24 successively determines whether the calculated rotational fluctuation difference ratio Nje2 is equal to or greater than a preset second random misfire judgment value E21 (step S960), whether the calculated rotational fluctuation difference ratio Nje3 is less than a preset third random misfire judgment value E32 (step S970), and whether the calculated rotational fluctuation difference ratio Nje4 is in a range of preset fourth random misfire judgment values E41 and E42 (step S980). The second random misfire judgment value E21 is experimentally or otherwise set to be smaller than the rotational fluctuation difference ratio Nje2 in the occurrence of a random misfire. The third random misfire judgment value E32 is experimentally or otherwise set to be greater than the rotational fluctuation difference ratio Nje3 in the occurrence of a random misfire. The fourth random misfire judgment values E41 and E42 are experimentally or otherwise set to define a range about the rotational fluctuation difference ratio Nje4 in the occurrence of a random misfire. When the rotational fluctuation difference ratio Nje2 is less than the second random misfire judgment value E21, when the rotational fluctuation difference ratio Nje3 is not less than the third random misfire judgment value E32, or when the rotational fluctuation difference ratio Nje4 is out of the range of the fourth random misfire judgment values E41 and E42 (one of steps S960 to S980: No), the engine electronic control unit 24 determines the non-occurrence of a random misfire and terminates the random misfire identification process of FIG. 15. When the rotational fluctuation difference ratio Nje2 is equal to or greater than the second random misfire judgment value E21, when the rotational fluctuation difference ratio Nje3 is less than the third random misfire judgment value E32, and when the rotational fluctuation difference ratio Nje4 is in the range of the fourth random misfire judgment values E41 and E42 (all of steps S960 to S980: Yes), on the other hand, the engine electronic control unit 24 determines the occurrence of a random misfire and outputs information on the occurrence of a random misfire (step S990), before terminating the random misfire identification process of FIG. 15. FIG. 19 shows a time change of the 90-degree rotational fluctuation difference Nxd90 in the occurrence of a random misfire. As clearly shown in FIG. 19, in the occurrence of a random misfire, the 90-degree rotational fluctuation differences Nxd90 of the misfire cylinder distinctly exceeds the first random misfire judgment value E1. The procedure of this embodiment sets the first random misfire judgment value E1 as the criterion of distinct identification and identifies a random misfire pattern based on the rotational fluctuation difference ratios Nje2 to Nje4. This arrangement thus ensures the adequate identification of a random misfire with high accuracy.

As described above, the engine misfire identification device mounted on the hybrid vehicle 20B of the second embodiment performs the single misfire identification process, the consecutive misfire identification process, the intermittent misfire identification process, the opposed misfire identification process, and the random misfire identification process with the rotational fluctuation Nxd, the 90-degree rotational fluctuation difference Nxd90, the 120-degree rotational fluctuation difference Nxd120, the 360-degree rotational fluctuation difference Nxd360, and the total rotational fluctuation Nxdint to adequately and accurately identify a single misfire, consecutive misfires, intermittent misfires, opposed misfires, and a random misfire. The engine misfire identification device of the second embodiment uses multiple different misfire judgment logics corresponding to multiple different misfire patterns to identify the misfires of the engine 22. This arrangement thus adequately and accurately identifies the occurrence and the pattern of misfires in the engine 22.

The engine misfire identification device mounted on the hybrid vehicle 20B of the second embodiment distinctly and adequately identifies opposed misfires with high accuracy, based on the 120-degree rotational fluctuation difference Nxd120 calculated as the difference between the rotational fluctuations Nxd at the specific crank angle CA corresponding to the ignition timing in each cylinder of the engine 22 and at the crank angle CA of 120 degrees before the specific crank angle CA, where the rotational fluctuation Nxd represents the variation in rotation speed N of the crankshaft 26 at the crank angle CA of every 30 degrees. The first opposed misfire judgment value D1 is set corresponding to the rotation speed N of the crankshaft 26 and the amount of intake air Ga in each rotation of the crankshaft 26. The use of this first opposed misfire judgment value D1 ensures the adequate and accurate identification of opposed misfires. The engine misfire identification device mounted on the hybrid vehicle 20B of the second embodiment identifies the opposed misfire pattern, based on the rotational fluctuation difference ratio Njd2 of the 120-degree rotational fluctuation difference Nxd120(1) of a misfire cylinder to the 120-degree rotational fluctuation difference Nxd120(4) of another misfire cylinder both exceeding the first opposed misfire judgment value D1, the reciprocal of the rotational fluctuation difference ratio Njd2, and the rotational fluctuation difference ratios Njd3, Njd4, Njd5, and Njd6 of the next and the second next 120-degree rotational fluctuation differences Nxd120(2), Nxd120(3), Nxd120(5), and Nxd120(6) of the next cylinders and the second next cylinders after the misfire cylinders to the sum of the 120-degree rotational fluctuation differences, Nxd120(1) and Nxd120(4) of the misfire cylinders. This arrangement ensures the adequate and accurate identification of opposed misfires and allows an adequate countermeasure to be taken against the identified opposed misfires.

The engine misfire identification device mounted on the hybrid vehicle 20B of the second embodiment distinctly and adequately identifies a random misfire with high accuracy, based on the 90-degree rotational fluctuation difference Nxd90 calculated as the difference between the rotational fluctuations Nxd at the specific crank angle CA corresponding to the ignition timing in each cylinder of the engine 22 and at the crank angle CA of 90 degrees before the specific crank angle CA, where the rotational fluctuation Nxd represents the variation in rotation speed N of the crankshaft 26 at the crank angle CA of every 30 degrees. The first random misfire judgment value E1 is set corresponding to the rotation speed N of the crankshaft 26 and the amount of intake air Ga in each rotation of the crankshaft 26. The use of this first random misfire judgment value E1 ensures the adequate and accurate identification of a random misfire. The engine misfire identification device mounted on the hybrid vehicle 20B of the second embodiment identifies the random misfire pattern, based on the rotational fluctuation difference ratio Nje2 of the next 90-degree rotational fluctuation difference Nxd90(4) of the next cylinder immediately after the misfire cylinder to the 90-degree rotational fluctuation difference Nxd90(3) of the misfire cylinder exceeding the first random misfire judgment value E1, the rotational fluctuation difference ratio Nje3 of the last 90-degree rotational fluctuation difference Nxd90(2) of the last cylinder immediately before the misfire cylinder to the 90-degree rotational fluctuation difference Nxd90(3), and the rotational fluctuation difference ratio Nje4 of the third last 90-degree rotational fluctuation difference Nxd90(0) of the third last cylinder before the misfire cylinder to the 90-degree rotational fluctuation difference Nxd90(3). This arrangement ensures the adequate and accurate identification of a random misfire and allows an adequate countermeasure to be taken against the identified random misfire.

The engine misfire identification device mounted on the hybrid vehicle 20B of the second embodiment also distinctly and adequately identifies a single misfire, consecutive misfires, and intermittent misfires with high accuracy, in a similar manner to the engine misfire identification device mounted on the hybrid vehicle 20 of the first embodiment.

The engine misfire identification device mounted on the hybrid vehicle 20B of the second embodiment performs the single misfire identification process, the consecutive misfire identification process, the intermittent misfire identification process, the opposed misfire identification process, and the random misfire identification process with the rotational fluctuation Nxd, the 90-degree rotational fluctuation difference Nxd90, the 120-degree rotational fluctuation difference Nxd120, the 360-degree rotational fluctuation difference Nxd360, and the total rotational fluctuation Nxdint to identify a single misfire, consecutive misfires, intermittent misfires, opposed misfires, and a random misfire. The misfire judgment logics adopted by the engine misfire identification device for identification of misfires are not restricted to the single misfire identification process, the consecutive misfire identification process, the intermittent misfire identification process, the opposed misfire identification process, or the random misfire identification process, but may be diversity of other misfire judgment logics corresponding to diversity of other misfire patterns. The use of all these misfire judgment logics for identification of misfires is not essential. One modified procedure may adopt only part of these misfire judgment logics and execute only some of the single misfire identification process, the consecutive misfire identification process, the intermittent misfire identification process to identify misfires, the opposed misfire identification process, and the random misfire identification process to identify misfires.

The engine misfire identification device mounted on the hybrid vehicle 20B of the second embodiment calculates the rotational fluctuation Nxd at the crank angle CA of every 120 degrees corresponding to the ignition timing in each cylinder of the engine 22 as the variation in rotation speed N of the crankshaft 26 computed at the crank angle CA of every 30 degrees. The rotational fluctuation Nxd may be calculated as a variation in rotation speed N of the crankshaft 26 computed at the crank angle CA of every preset degrees. The rotational fluctuation Nxd may otherwise be calculated as an angular acceleration at the crank angle CA of every 120 degrees corresponding to the ignition timing in each cylinder of the engine 22.

The opposed misfire identification process executed by the engine misfire identification device mounted on the hybrid vehicle 20B of the second embodiment sets the first opposed misfire judgment value D1 corresponding to the rotation speed N of the crankshaft 26 and the amount of intake air Ga in each rotation of the crankshaft 26 and uses this first opposed misfire judgment value D1 to identify opposed misfires. The first opposed misfire judgment value D1 used for identification of opposed misfires may be set only corresponding to the amount of intake air Ga in each rotation of the crankshaft 26 regardless of the rotation speed N of the crankshaft 26 or may alternatively be set only corresponding to the rotation speed N of the crankshaft 26 regardless of the amount of intake air Ga in each rotation of the crankshaft 26. The first opposed misfire judgment value D1 used for identification of opposed misfires may otherwise be set regardless of the rotation speed N of the crankshaft 26 and the amount of intake air Ga in each rotation of the crankshaft 26.

The opposed misfire identification process executed by the engine misfire identification device mounted on the hybrid vehicle 20B of the second embodiment identifies the opposed misfire pattern, based on the rotational fluctuation difference ratio Njd2 of the 120-degree rotational fluctuation difference Nxd120(1) of a misfire cylinder to the 120-degree rotational fluctuation difference Nxd120(4) of another misfire cylinder both exceeding the first opposed misfire judgment value D1, the reciprocal of the rotational fluctuation difference ratio Njd2, and the rotational fluctuation difference ratios Njd3, Njd4, Njd5, and Njd6 of the next and the second next 120-degree rotational fluctuation differences Nxd120(2), Nxd120(3), Nxd120(5), and Nxd120(6) of the next cylinders and the second next cylinders after the misfire cylinders to the sum of the 120-degree rotational fluctuation differences Nxd120(1) and Nxd120(4) of the misfire cylinders. The use of all the rotational fluctuation difference ratio Njd2, the reciprocal of the rotational fluctuation difference ratio Njd2, and the rotational fluctuation difference ratios Njd3, Njd4, Njd5, and Njd6 for identification of the opposed misfire pattern is not essential. The identification of the opposed misfire pattern may be based on only some of the rotational fluctuation difference ratio Njd2, the reciprocal of the rotational fluctuation difference ratio Njd2, and the rotational fluctuation difference ratios Njd3, Njd4, Njd5, and Njd6 or may not use any of the rotational fluctuation difference ratio Njd2, the reciprocal of the rotational fluctuation difference ratio Njd2, and the rotational fluctuation difference ratios Njd3, Njd4, Njd5, and Njd6. Another possible modification may use one or multiple different rotational fluctuation ratios other than the rotational fluctuation difference ratio Njd2, the reciprocal of the rotational fluctuation difference ratio Njd2, and the rotational fluctuation difference ratios Njd3, Njd4, Njd5, and Njd6 to identify the opposed misfire pattern.

The random misfire identification process executed by the engine misfire identification device mounted on the hybrid vehicle 20B of the second embodiment sets the first random misfire judgment value E1 corresponding to the rotation speed N of the crankshaft 26 and the amount of intake air Ga in each rotation of the crankshaft 26 and uses this first random misfire judgment value E1 to identify a random misfire. The first random misfire judgment value E1 used for identification of a random misfire may be set only corresponding to the amount of intake air Ga in each rotation of the crankshaft 26 regardless of the rotation speed N of the crankshaft 26 or may alternatively be set only corresponding to the rotation speed N of the crankshaft 26 regardless of the amount of intake air Ga in each rotation of the crankshaft 26. The first random misfire judgment value E1 used for identification of a random misfire may otherwise be set regardless of the rotation speed N of the crankshaft 26 and the amount of intake air Ga in each rotation of the crankshaft 26.

The random misfire identification process executed by the engine misfire identification device mounted on the hybrid vehicle 20B of the second embodiment identifies the random misfire pattern, based on the rotational fluctuation difference ratio Nje2 of the next 90-degree rotational fluctuation difference Nxd90(4) of the next cylinder immediately after the misfire cylinder to the 90-degree rotational fluctuation difference Nxd90(3) of the misfire cylinder exceeding the first random misfire judgment value E1, the rotational fluctuation difference ratio Nje3 of the last 90-degree rotational fluctuation difference Nxd90(2) of the last cylinder immediately before the misfire cylinder to the 90-degree rotational fluctuation difference Nxd90(3), and the rotational fluctuation difference ratio Nje4 of the third last 90-degree rotational fluctuation difference Nxd90(0) of the third last cylinder before the misfire cylinder to the 90-degree rotational fluctuation difference Nxd90(3). The use of all these rotational fluctuation difference ratios Nje2, Nje3, and Nje4 for identification of the random misfire pattern is not essential. The identification of the random misfire pattern may be based on only some of these rotational fluctuation difference ratios Nje2, Nje3, and Nje4 or may not use any of these rotational fluctuation difference ratios Nje2, Nje3, and Nje4. Another possible modification may use one or multiple different rotational fluctuation difference ratios other than these rotational fluctuation difference ratios Nje2, Nje3, and Nje4 to identify the random misfire pattern.

The engine misfire identification device mounted on the hybrid vehicle 20B of the second embodiment may also adopt the modifications of the single misfire identification process, the consecutive misfire identification process, and the intermittent misfire identification process described above as the possible modifications of the engine misfire identification device mounted on the hybrid vehicle 20 of the first embodiment.

The engine misfire identification device mounted on the hybrid vehicles 20 and 20B of the first and the second embodiments identifies misfires in the inline six-cylinder engine 22. The engine misfire identification device of the invention is applicable to any engine having multiple cylinders.

The first embodiment and the second embodiment described above regard the engine misfire identification device mounted on the hybrid vehicle 20 or 20B, which is equipped with the engine 22, the planetary gear mechanism 30, and the two motors MG1 and MG2. The engine misfire identification device of the invention may also be applied to identify misfires in an engine mounted on any of hybrid vehicles having various configurations and to identify misfires in an engine mounted on any of various motor vehicles other than the hybrid vehicles. The engine misfire identification device of the invention may further be applicable to identify misfires in an internal combustion engine incorporated in any of various moving bodies other than motor vehicles and in any of stationary equipment.

The first embodiment and the second embodiment described above regard the engine misfire identification device mounted on the hybrid vehicle 20 or 20b. The technique of the invention may also be actualized by a corresponding engine misfire identification method to identify misfires in the engine 22 mounted on the hybrid vehicle 20 or 20B.

The embodiments and their modifications discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the present invention is preferably applicable to manufacturing industries of internal combustion engines and motor vehicles equipped with the internal combustion engines.

The invention claimed is:

1. An engine misfire identification method that identifies a misfire in an internal combustion engine mounted on a hybrid vehicle, the hybrid vehicle being equipped with the internal combustion engine that has multiple cylinders and is driven at a specific drive point set independently of a driving state of the hybrid vehicle, a generator that is mechanically linked with a crankshaft of the internal combustion engine and uses an output power of the crankshaft to generate electric power, and a motor that is capable of outputting a driving power, said engine misfire identification method comprising the steps of:

sequentially computing a rotational fluctuation of the internal combustion engine at every specific crank angle corresponding to an ignition timing in each of the multiple cylinders of the internal combustion engine, from a rotational position of the crankshaft of the internal combustion engine; and adopting multiple different misfire judgment logics corresponding to multiple different misfire patterns to identify a misfire in the internal combustion engine, based on the sequentially computed rotational fluctuations, where the multiple different misfire judgment logics include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment logic to identify an intermittent misfire pattern where two non-consecutive cylinders across one combustion cylinder among the multiple cylinders have misfires, wherein the single misfire judgment logic identifies a single misfire in the internal combustion engine when only one rotational fluctuation defined as an object rotational fluctuation among the rotational fluctuations sequentially computed in one cycle of the internal combustion engine is not less than a preset single misfire judgment value and when a ratio of another rotational fluctuation to the object rotational fluctuation of not less than the preset single misfire judgment value is in a preset single misfire judgment range, the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value, and the intermittent misfire judgment logic successively calculates a total rotational fluctuation as a sum of each of the rotational fluctuations sequentially computed at every specific crank angle and the previous rotational fluctuation computed at the crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value.

2. An engine misfire identification method that identifies a misfire in an internal combustion engine mounted on a hybrid vehicle, the hybrid vehicle being equipped with the internal combustion engine that has multiple cylinders and is driven at a specific drive point set independently of a driving state of the hybrid vehicle, a generator that is mechanically linked with a crankshaft of the internal combustion engine and uses an output power of the crankshaft to generate electric power, and a motor that is capable of outputting a driving power, said engine misfire identification method comprising the steps of:

sequentially computing a rotational fluctuation of the internal combustion engine at every specific crank angle corresponding to an ignition timing in each of the multiple cylinders of the internal combustion engine, from a rotational position of the crankshaft of the internal combustion engine; and adopting multiple different misfire judgment logics corresponding to multiple different misfire patterns to identify a misfire in the internal combustion engine, based on the sequentially computed rotational fluctuations, where the multiple different misfire judgment logics include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment logic to identify an intermittent misfire pattern where two non-consecutive cylinders across one combustion cylinder among the multiple cylinders have misfires, an opposed misfire judgment logic to identify an opposed misfire pattern where two opposed cylinders among the multiple cylinders have misfires, and a random misfire judgment logic to identify a random misfire pattern where one of the multiple cylinders has a misfire irregularly in one cycle of the internal combustion engine, wherein the single misfire judgment logic identifies a single misfire in the internal combustion engine when only one rotational fluctuation defined as an object rotational fluctuation among the rotational fluctuations sequentially computed in one cycle of the internal combustion engine is not less than a preset single misfire judgment value and when a ratio of another rotational fluctuation to the object rotational fluctuation of not less than the preset single misfire judgment value is in a preset single misfire judgment range, the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value, and the intermittent misfire judgment logic successively calculates a total rotational fluctuation as a sum of each of the rotational fluctuations sequentially computed at every specific crank angle and the previous rotational fluctuation computed at the crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value, the opposed misfire judgment logic successively calculates a rotational fluctuation difference as a difference between each of the rotational fluctuations sequentially computed at every specific crank angle and a previous rotational fluctuation computed at a crank angle of 120 degrees before the specific crank angle, and identifies opposed misfires in the internal combustion engine when two rotational fluctuation differences defined as two object rotational fluctuation differences among the rotational fluctuation differences successively calculated in one cycle of the internal combustion engine are not less than a preset opposed misfire judgment value, and the random misfire judgment logic successively calculates a rotational fluctuation difference as a difference between each of the rotational fluctuations sequentially computed at every specific crank angle and a previous rotational fluctuation computed at a crank angle of 90 degrees before the specific crank angle, and identifies a random misfire in the internal combustion engine when one rotational fluctuation difference defined as an object rotational fluctuation difference among the rotational fluctuation differences successively calculated in one cycle of the internal combustion engine is not less than a preset random misfire judgment value.

3. An engine misfire identification device that identifies a misfire in an internal combustion engine mounted on a hybrid vehicle, the hybrid vehicle being equipped with the internal combustion engine that has multiple cylinders and is driven at a specific drive point set independently of a driving state of the hybrid vehicle, a generator that is mechanically linked with a crankshaft of the internal combustion engine and uses an output power of the crankshaft to generate electric power, and a motor that is capable of outputting a driving power, said engine misfire identification device comprising:

a rotational position detection sensor that detects a rotational position of the crankshaft of the internal combustion engine;

a rotational fluctuation computation unit that sequentially computes a rotational fluctuation of the internal combustion engine at every specific crank angle corresponding to an ignition timing in each of the multiple cylinders of the internal combustion engine, from the detected rotational position of the crankshaft; and an engine misfire identification module that adopts multiple different misfire judgment logics corresponding to multiple different misfire patterns to identify a misfire in the internal combustion engine, based on the sequentially computed rotational fluctuations, where the multiple different misfire judgment logics include a single misfire judgment logic to identify a single misfire pattern where only one of the multiple cylinders has a misfire, wherein the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range, and the another rotational fluctuation includes at least one of a third last rotational fluctuation computed before the object rotational fluctuation, a last rotational fluctuation computed immediately before the object rotational fluctuation, and a next rotational fluctuation computed immediately after the object rotational fluctuation.

4. An engine misfire identification device in accordance with claim 3, said engine misfire identification device comprising:

a rotation speed measurement unit that measures a rotation speed of the internal combustion engine; and a first single misfire judgment value regulation module that regulates the single misfire judgment value to decrease with an increase in measured rotation speed of the internal combustion engine.

5. An engine misfire identification device in accordance with claim 3, said engine misfire identification device comprising:

an air intake amount measurement unit that measures an amount of intake air into the internal combustion engine; and a second single misfire judgment value regulation module that calculates a cycle air intake amount in one cycle of the internal combustion engine from the measured amount of intake air and regulates the single misfire judgment value to increase with an increase in calculated cycle air intake amount.

6. An engine misfire identification device in accordance with claim 3, wherein the rotational fluctuation computation unit calculates an angular velocity at every preset crank angle of the crankshaft of the internal combustion engine and computes a difference between a specific angular velocity corresponding to an ignition timing in each of the multiple cylinders of the internal combustion engine and a last angular velocity calculated immediately before the specific angular velocity, as the rotational fluctuation.

7. An engine misfire identification device in accordance with claim 3, wherein the rotational fluctuation computation unit computes an angular acceleration corresponding to an ignition timing in each of the multiple cylinders of the internal combustion engine, as the rotational fluctuation.

8. An engine misfire identification device that identifies a misfire in an internal combustion engine mounted on a hybrid vehicle, the hybrid vehicle being equipped with the internal combustion engine that has multiple cylinders and is driven at a specific drive point set independently of a driving state of the hybrid vehicle, a generator that is mechanically linked with a crankshaft of the internal combustion engine and uses an output power of the crankshaft to generate electric power, and a motor that is capable of outputting a driving power, said engine misfire identification device comprising:

a rotational position detection sensor that detects a rotational position of the crankshaft of the internal combustion engine;

a rotational fluctuation computation unit that sequentially computes a rotational fluctuation of the internal combustion engine at every specific crank angle corresponding to an ignition timing in each of the multiple cylinders of the internal combustion engine, from the detected rotational position of the crankshaft; and an engine misfire identification module that adopts multiple different misfire judgment logics corresponding to multiple different misfire patterns to identify a misfire in the internal combustion engine, based on the sequentially computed rotational fluctuations, where the multiple different misfire judgment logics include at least one of a single misfire judgment logic to identify a single misfire pattern where only one of the multiple cylinders has a misfire, a consecutive misfire judgment logic to identify a consecutive misfire pattern where two consecutive cylinders among the multiple cylinders have misfires, and an intermittent misfire judgment logic to identify an intermittent misfire pattern where two nonconsecutive cylinders across one combustion cylinder among the multiple cylinders have misfires, wherein the single misfire judgment logic identifies a single misfire in the internal combustion engine when only one rotational fluctuation defined as an object rotational fluctuation among the rotational fluctuations sequentially computed in one cycle of the internal combustion engine by the rotational fluctuation computation unit is not less than a preset single misfire judgment value and when a ratio of another rotational fluctuation to the object rotational fluctuation of not less than the preset single misfire judgment value is in a preset single misfire judgment range, the consecutive misfire judgment logic successively calculates a rotational fluctuation difference as a difference between each of the rotational fluctuations sequentially computed at every specific crank angle and a previous rotational fluctuation computed at a crank angle of 360 degrees before the specific crank angle, and identifies consecutive misfires in the internal combustion engine when only one rotational fluctuation difference defined as an object rotational fluctuation difference among the rotational fluctuation differences successively calculated in one cycle of the internal combustion engine is not less than a preset consecutive misfire judgment value, and the intermittent misfire judgment logic successively calculates a total rotational fluctuation as a sum of each of the rotational fluctuations sequentially computed at every specific crank angle and the previous rotational fluctuation computed at the crank angle of 360 degrees before the specific crank angle, and identifies intermittent misfires in the internal combustion engine when only one total rotational fluctuation defined as an object total rotational fluctuation among the total rotational fluctuations successively calculated in one cycle of the internal combustion engine is not less than a preset intermittent misfire judgment value.

9. An engine misfire identification device in accordance with claim 8, wherein the another rotational fluctuation difference includes at least one of a third last rotational fluctuation difference calculated before the object rotational fluctuation difference, a last rotational fluctuation difference calculated immediately before the object rotational fluctuation difference, and a next rotational fluctuation difference calculated immediately after the object rotational fluctuation difference.

10. An engine misfire identification device in accordance with claim 8 said engine misfire identification device comprising:
a rotation speed measurement unit that measures a rotation speed of the internal combustion engine; and
a first consecutive misfire judgment value regulation module that regulates the consecutive misfire judgment value to decrease with an increase in measured rotation speed of the internal combustion engine.

11. An engine misfire identification device in accordance with claim 8 said engine misfire identification device comprising:
an air intake amount measurement unit that measures an amount of intake air into the internal combustion engine; and
a second consecutive misfire judgment value regulation module that calculates a cycle air intake amount in one cycle of the internal combustion engine from the measured amount of intake air and regulates the consecutive misfire judgment value to increase with an increase in calculated cycle air intake amount.

12. An engine misfire identification device in accordance with claim 8 said engine misfire identification device comprising:
a rotation speed measurement unit that measures a rotation speed of the internal combustion engine; and
a first intermittent misfire judgment value regulation module that regulates the intermittent misfire judgment value to decrease with an increase in measured rotation speed of the internal combustion engine.

13. An engine misfire identification device in accordance with claim 8, said engine misfire identification device comprising:
an air intake amount measurement unit that measures an amount of intake air into the internal combustion engine; and
a second intermittent misfire judgment value regulation module that calculates a cycle air intake amount in one cycle of the internal combustion engine from the measured amount of intake air and regulates the intermittent misfire judgment value to increase with an increase in calculated cycle air intake amount.

14. An engine misfire identification device in accordance with claim 8 wherein the rotational fluctuation computation unit calculates an angular velocity at every preset crank angle of the crankshaft of the internal combustion engine and computes a difference between a specific angular velocity corresponding to an ignition timing in each of the multiple cylinders of the internal combustion engine and a last angular velocity calculated immediately before the specific angular velocity, as the rotational fluctuation.

15. An engine misfire identification device in accordance with claim 8 wherein the rotational fluctuation computation unit computes an angular acceleration corresponding to an ignition timing in each of the multiple cylinders of the internal combustion engine, as the rotational fluctuation.

16. An engine misfire identification device in accordance with claim 8, wherein the intermittent misfire judgment logic identifies intermittent misfires in the internal combustion engine when a ratio of another total rotational fluctuation to the object total rotational fluctuation of not less than the preset intermittent misfire judgment value is in a preset intermittent misfire judgment range.

17. An engine misfire identification device in accordance with claim 16, wherein the another total rotational fluctuation is a last total rotational fluctuation calculated immediately before the object total rotational fluctuation.

18. An engine misfire identification device in accordance with claim 8 wherein the internal combustion engine has an even number of the multiple cylinders, and
the multiple different misfire judgment logics adopted by said engine misfire identification module for identification of a misfire in the internal combustion engine include at least one of the single misfire judgment logic, the consecutive misfire judgment logic, the intermittent misfire judgment logic, an opposed misfire judgment logic to identify an opposed misfire pattern where two opposed cylinders among the multiple cylinders have misfires, and a random misfire judgment logic to identify a random misfire pattern where one of the multiple cylinders has a misfire irregularly in one cycle of the internal combustion engine,
wherein the opposed misfire judgment logic successively calculates a rotational fluctuation difference as a difference between each of the rotational fluctuations sequentially computed at every specific crank angle and a previous rotational fluctuation computed at a crank angle of 120 degrees before the specific crank angle, and identifies opposed misfires in the internal combustion engine when two rotational fluctuation differences defined as two object rotational fluctuation differences among the rotational fluctuation differences successively calculated in one cycle of the internal combustion engine are not less than a preset opposed misfire judgment value, and
the random misfire judgment logic successively calculates a rotational fluctuation difference as a difference between each of the rotational fluctuations sequentially computed at every specific crank angle and a previous rotational fluctuation computed at a crank angle of 90 degrees before the specific crank angle, and identifies a random misfire in the internal combustion engine when one rotational fluctuation difference defined as an object rotational fluctuation difference among the rotational fluctuation differences successively calculated in one cycle of the internal combustion engine is not less than a preset random misfire judgment value.

19. An engine misfire identification device in accordance with claim 18, said engine misfire identification device comprising:
a rotation speed measurement unit that measures a rotation speed of the internal combustion engine; and a first opposed misfire judgment value regulation module that regulates the opposed misfire judgment value to decrease with an increase in measured rotation speed of the internal combustion engine.

20. An engine misfire identification device in accordance with claim 18, said engine misfire identification device comprising:
an air intake amount measurement unit that measures an amount of intake air into the internal combustion engine; and
a second opposed misfire judgment value regulation module that calculates a cycle air intake amount in one cycle of the internal combustion engine from the measured amount of intake air and regulates the opposed misfire judgment value to increase with an increase in calculated cycle air intake amount.

21. An engine misfire identification device in accordance with claim 18, said engine misfire identification device comprising:
a rotation speed measurement unit that measures a rotation speed of the internal combustion engine; and
a first random misfire judgment value regulation module that regulates the random misfire judgment value to decrease with an increase in measured rotation speed of the internal combustion engine.

22. An engine misfire identification device in accordance with claim 18, said engine misfire identification device comprising:
an air intake amount measurement unit that measures an amount of intake air into the internal combustion engine; and
a second random misfire judgment value regulation module that calculates a cycle air intake amount in one cycle of the internal combustion engine from the measured amount of intake air and regulates the random misfire judgment value to increase with an increase in calculated cycle air intake amount.

23. An engine misfire identification device in accordance with claim 18, wherein the opposed misfire judgment logic identifies opposed misfires in the internal combustion engine when a ratio of the two object rotational fluctuation differences of not less than the preset opposed misfire judgment value is in a preset first opposed misfire judgment range and when a ratio of another rotational fluctuation difference to a sum of the two object rotational fluctuation differences is in a preset second opposed misfire judgment range.

24. An engine misfire identification device in accordance with claim 23, wherein the another rotational fluctuation difference includes at least either of two last rotational fluctuation differences calculated immediately before the two object rotational fluctuation differences and two second last rotational fluctuation differences calculated before the two object rotational fluctuation differences.

25. An engine misfire identification device in accordance with claim 18, wherein the random misfire judgment logic identifies a random misfire in the internal combustion engine when a ratio of another rotational fluctuation difference to the object rotational fluctuation difference of not less than the preset random misfire judgment value is in a preset random misfire judgment range.

26. An engine misfire identification device in accordance with claim 25, wherein the another rotational fluctuation difference includes at least one of a last rotational fluctuation difference calculated immediately before the object rotational fluctuation difference, a next rotational fluctuation difference calculated immediately after the object rotational fluctuation difference, and a third next rotational fluctuation difference calculated after the object rotational fluctuation difference.

* * * * *

UNITED STATES PATENT AND TRADEMARK OFFICE
CERTIFICATE OF CORRECTION

PATENT NO. : 7,503,207 B2
APPLICATION NO. : 11/792249
DATED : March 17, 2009
INVENTOR(S) : Takahiro Nishigaki et al.

Page 1 of 1

It is certified that error appears in the above-identified patent and that said Letters Patent is hereby corrected as shown below:

| Column | Line | |
|---|---|---|
| 20 | 20 | Change "vehicle 200" to --vehicle 20--. |
| 35 | 23 | Claim 10 After "claim 8" insert --,--. |
| 35 | 32 | Claim 11 After "claim 8" insert --,--. |
| 35 | 44 | Claim 12 After "claim 8" insert --,--. |
| 36 | 23 | Claim 18 After "claim 8" insert --,--. |

Signed and Sealed this

Twelfth Day of May, 2009

JOHN DOLL
*Acting Director of the United States Patent and Trademark Office*